(12) United States Patent
Moore et al.

(10) Patent No.: US 7,403,840 B2
(45) Date of Patent: Jul. 22, 2008

(54) IRRIGATION CONTROL SYSTEM

(75) Inventors: Steven Edward Moore, Logan, UT (US); Travis L. Barney, Logan, UT (US); Charles Ashurst, Logan, UT (US)

(73) Assignee: Irrisoft, Inc., North Logan, UT (US)

( * ) Notice: Subject to any disclaimer, the term of this patent is extended or adjusted under 35 U.S.C. 154(b) by 253 days.

(21) Appl. No.: 10/420,536

(22) Filed: Apr. 21, 2003

(65) Prior Publication Data
US 2004/0039489 A1 Feb. 26, 2004

Related U.S. Application Data

(60) Provisional application No. 60/374,193, filed on Apr. 19, 2002.

(51) Int. Cl.
*G05D 7/00* (2006.01)
(52) U.S. Cl. ...................... 700/284; 700/282
(58) Field of Classification Search ......... 700/282–284; 239/67, 69; 137/78.2; 702/3
See application file for complete search history.

(56) References Cited

U.S. PATENT DOCUMENTS

| | | |
|---|---|---|
| 3,114,243 A | 12/1963 | Winters |
| 3,372,899 A | 3/1968 | McPherson |
| 3,653,595 A | 4/1972 | Greengard, Jr. et al. |
| 3,726,477 A | 4/1973 | Shapiro |
| 4,010,898 A | 3/1977 | Williams |
| 4,146,049 A | 3/1979 | Kruse et al. |
| 4,185,650 A | 1/1980 | Neves et al. |
| 4,208,630 A | 6/1980 | Martinez |
| 4,209,131 A | 6/1980 | Barash et al. |
| RE31,023 E | 9/1982 | Hall, III |
| 4,396,149 A | 8/1983 | Hirsch |
| 4,431,338 A | 2/1984 | Hornabrook |
| 4,526,034 A | 7/1985 | Campbell et al. |
| 4,626,984 A | 12/1986 | Unruh et al. |
| 4,646,224 A | 2/1987 | Ransburg et al. |
| 4,691,341 A | 9/1987 | Knoble et al. |
| 4,709,585 A | 12/1987 | Altenhofen |
| 4,837,499 A | 6/1989 | Scherer, III |
| 4,856,227 A | 8/1989 | Oglevee et al. |
| 4,858,377 A | 8/1989 | Oglevee et al. |

(Continued)

OTHER PUBLICATIONS

Cable, Computer (Telemetry) Controls for Self-Propelled Systems, 1986.

(Continued)

*Primary Examiner*—Alexander J Kosowski
(74) *Attorney, Agent, or Firm*—Clayton, Howarth & Cannon, P.C.

(57) ABSTRACT

An irrigation control system and method for controlling irrigation based on weather data. Weather data such as wind, temperature, solar radiation, humidity, and rainfall, may be collected at one or more weather stations for a region. The weather data may be compiled on a computer and transmitted to a paging broadcast service. The weather data may then be transmitted by the paging broadcast service to controller interfaces associated with irrigation systems throughout the region. The controller interfaces may adjust irrigation controllers associated with the irrigation systems based on the weather data such that the proper amount of water is applied. This allows the water to be used more efficiently and the health of the landscape to be improved.

11 Claims, 19 Drawing Sheets

U.S. PATENT DOCUMENTS

| | | | |
|---|---|---|---|
| 4,934,400 A | 6/1990 | Cuming | |
| 4,952,868 A | 8/1990 | Scherer, III | |
| 4,962,522 A | 10/1990 | Marian | |
| 4,967,789 A | 11/1990 | Kypris | |
| 5,023,787 A | 6/1991 | Evelyn-Veere | |
| 5,097,861 A | 3/1992 | Hopkins et al. | |
| 5,121,340 A | 6/1992 | Campbell et al. | |
| 5,208,855 A * | 5/1993 | Marian | 239/69 |
| 5,229,937 A | 7/1993 | Evelyn-Veere | |
| 5,244,177 A | 9/1993 | Campbell et al. | |
| 5,465,904 A | 11/1995 | Vaello | |
| 5,479,339 A | 12/1995 | Miller | |
| 5,848,378 A * | 12/1998 | Shelton et al. | 702/3 |
| 5,870,302 A * | 2/1999 | Oliver | 700/11 |
| 6,076,740 A * | 6/2000 | Townsend | 239/1 |
| 6,314,340 B1 | 11/2001 | Mecham et al. | |
| 6,343,255 B1 * | 1/2002 | Peek et al. | 702/3 |
| 6,784,786 B1 * | 8/2004 | Sumner | 340/10.32 |
| 6,823,239 B2 * | 11/2004 | Sieminski | 700/284 |
| 6,944,523 B2 * | 9/2005 | Addink et al. | 700/284 |
| 2002/0010516 A1 * | 1/2002 | Addink et al. | 700/19 |
| 2002/0027504 A1 * | 3/2002 | Davis et al. | 340/540 |
| 2002/0198990 A1 * | 12/2002 | Bradfield et al. | 709/224 |

OTHER PUBLICATIONS

Duke et al. "Future of Irrigation-Processors and Controllers," Irrigation: Challenges of the 80's, pp. 233-241, Oct. 1980.

Duke et al. "Computer Interfacing for Center Pivot Monitoring, Control, and Irrigation Scheduling," Agricultural Electronics—1983 and Beyond, vol. 1, Dec. 1983.

Heermann, Scheduling with Remote Control Systems, 1986.

King, "Radio- or Clock-Activated Semi-Automatic Irrigation Gate Controller," Agricultural Electronics—1983 and Beyond, Dec. 1983.

Smith, Centralized Control and Irrigation Scheduling for Commercial Landscapes, 1986.

Snyder, Evapotranspiration-Based Irrigation Scheduling—The CIMIS Experience, 1986.

\* cited by examiner

IRRIGATION CONTROL SYSTEM

CROSS-REFERENCE TO RELATED APPLICATIONS

This application claims the benefit of U.S. Provisional Application No. 60/374,193 filed on Apr. 19, 2002, which is hereby incorporated by reference herein in its entirety, including but not limited to those portions that specifically appear hereinafter.

STATEMENT REGARDING FEDERALLY SPONSORED RESEARCH OR DEVELOPMENT

Not Applicable.

BACKGROUND OF THE INVENTION

1. The Field of the Invention

The present invention relates generally to irrigation control systems, and more particularly, but not necessarily entirely, to systems that utilize weather data for irrigation control.

2. Description of Background Art

Water conservation is a major issue in many parts of the world. In particular, population growth is putting fresh water supplies under tremendous strain. Notably, landscape water usage consumes more than half of the potable water supplies in some areas. Landscape water usage refers to the artificial application of water to promote the growth of desired plants. This is especially true in agricultural areas where crops require frequent watering in order to achieve maximum yield. However, residential, governmental and commercial water usage also significantly taps the available water supply, i.e., yards, golf courses, and parks also demand significant amounts of water to maintain healthy foliage.

A well known device to conserve and apply water during landscape watering is an irrigation system which controls the application of the water. A typical irrigation system comprises an irrigation controller, valves, pipes, and sprinkling heads. The irrigation controller, customarily also known as a clock or timer, automatically regulates the opening and the closing of the valves. The valves allow water to pass into the pipes and out of the sprinkling heads thereby irrigating the desired location. Properly configured, an irrigation controller can achieve some conservation of water. Irrigation controllers are commonly employed in the agricultural, commercial, governmental and residential settings albeit the scale of the operation can vary dramatically. The irrigation controller is often set to water "automatically" on preset days and times. Thus, the user can at least be assured that the watering occurs so that at least a predetermined amount of water is dispensed but often without any adjustment being made if a reduced amount of water would be optimum.

One great disadvantage to using an irrigation controller preset to water at specified days and times is the inability to automatically adjust for changing water requirements of the landscape. For example, during a rainy period, many previously available irrigation controllers still water even though no watering may be needed due to rainfall. Likewise, during a hot and windy period, additional water may be needed but because of the preset schedule, it is not provided. Also, because of the changing seasons in many areas, one preset watering schedule usually will not effectively water the landscape over a period of several months, i.e., less water may be needed in the spring than the hot summer months.

Furthermore, because the lack of water is potentially more harmful than too much water (except in the extreme case), the previously available irrigation controllers are typically programmed to "over water" to provide a margin of safety to the landscape and avoid death of the landscape due to dehydration. While this ensures that the landscape has sufficient water to maintain a viable landscape, it commonly results in wasteful water consumption.

In order to overcome the aforementioned problems, recently developed irrigation controllers are capable of receiving electronic input to improve the watering of the landscape based upon the estimated water needs of the landscape. The water requirement for the landscape can be determined through several methods, including visual inspection, soil moisture sensors, evaporative pan measurements or by calculating the evapotranspiration. Evapotranspiration is the most popular method for determining the water needs of the landscape.

Evapotranspiration is defined as the water lost to the atmosphere by two processes-evaporation and transpiration. Evaporation is the loss from open bodies of water, such as lakes and reservoirs, wetlands, bare soil, and snow cover; transpiration is the loss of water from living-plant surfaces. Several factors other than the physical characteristics of the water, soil, snow, and plant surface also affect the evapotranspiration process. The more important factors which impact evapotranspiration include net solar radiation, relative humidity, wind speed, density and type of vegetative cover, availability of soil moisture, elevation above sea level, reflective land-surface characteristics, and season of year. Because of the importance of solar energy to evapotranspiration, the evapotranspiration which is actually experienced also varies with latitude, season of year, time of day, and cloud cover. Evapotranspiration is typically expressed in either millimeters or inches of water per hour, per day or week.

The seasonal variability in evapotranspiration differs greatly and is similar to the seasonal trend in air temperature. Daily fluctuations in evapotranspiration can also occur. On clear days, the rate of transpiration increases rapidly in the morning and reaches a maximum usually in early afternoon or midafternoon. The midday warmth can cause closure of plant stomata, which results in a decrease in transpiration.

Numerous formulas have been developed, tested and refined over the years to calculate evapotranspiration. The formulas typically have been developed to reference either alfalfa or cool-season turf grass. To adapt the results to a specific plant, the reference value is modified by a crop coefficient. Each crop has its own crop coefficient curve, which is based upon plant physiology, height, density and growth stage. Research is ongoing to provide crop coefficient data for various crops and seasonal changes. The estimated potential evapotranspiration may differ from actual evapotranspiration based on water stress of the plants, and based on the margin of error of the model or equation used for the estimate.

Due to the large number of evapotranspiration equations in use today, the Evapotranspiration in Hydrology and Irrigation Committee of the American Society of Civil Engineers developed the "Standardized Reference Evapotranspiration Equation." Two equations were actually developed, one for short clipped grass and the other for tall crop. The landscape industry has also generally accepted a formula referred to as the FAO Penman-Monteith equation as a reliable means of calculating the potential evapotranspiration. Further information regarding evapotranspiration and the FAO Penman-Monteith equation can be found in Crop Evapotranspiration: Guidelines for Computing Crop Water Requirements published by Food & Agriculture Organization of the United States (June 2000) and also located at http://www.fao.org on the internet, both of which are hereby incorporated by reference in their entirety. It should be noted that as used herein, the term evapotranspiration refers to the actual evapotranspiration or the potential evapotranspiration determined from any of the methodologies now known or may become known in the future. Other methodologies, without limitation, include the Blaney-Criddle, radiation, and pan evaporation methods.

Most estimates of evapotranspiration are derived from studies of areas where climate, available moisture, and plant cover are relatively uniform. In order to calculate evapotranspiration for an area, a weather station collects data that can be used in the equation. For example, temperature, wind, solar-radiation and humidity values are collected and logged hourly by the weather station and are retrieved by a computer. The evapotranspiration can then be used to determine if an adjustment to the preset water schedule is warranted.

Once the evapotranspiration has been calculated, a crop coefficient is used to modify the reference evapotranspiration to reflect the water use of a particular plant or group of plants particularly with reference to the plant species. In some areas, the crop coefficient values changes seasonally.

One major problem with the previously available systems is that once the evapotranspiration has been calculated for an area based upon the measurements obtained from a weather station, the irrigation controllers must still be adjusted based upon that information. This is problematic because the irrigation controller may be located some distance from the weather station or central control computer where the evapotranspiration was initially calculated. Placing a weather station and computer to calculate the evapotranspiration near each irrigation controller is cost prohibitive in all but a few cases.

An attempt to overcome this drawback has been developed to utilize two-way communications, an on-site water manager, and an operator to monitor every irrigation controller. The operator communicates to a water manager by radio or cell phone the required information obtained from a weather station to adjust the watering schedule. The water manager can then make the appropriate adjustments to the irrigation controller. It has been recognized that the need for human intervention has prevented implementation of such systems on a wide scale basis.

Another attempt to overcome the aforementioned drawbacks, utilizes the step of having a user manually phone a commercial radio paging station to generate a paging signal for transmission to a receiver connected to a specific irrigation controller. The user first obtains the weather data and calculates the evapotranspiration to determine the appropriate adjustment to the watering schedule. Once the paging signal has been received by the receiver, it interfaces with the irrigation controller to control the watering schedule. A problem with this system is that the user of the system must manually call the paging station to send a signal to control the irrigation system. Further, each irrigation controller has a separate paging number, thereby requiring a separate call and page for each irrigation controller. Again, the described system disadvantageously requires intervention by a human and is therefore not fully automated.

In still another attempt to overcome the aforementioned drawbacks, coded evapotranspiration values and corresponding evapotranspiration zones are broadcast to a collection of microprocessor-based irrigation sprinkler controllers located within a geographic area. The controllers produce an adjustment value responsive to the evapotranspiration data which is broadcast for a particular zone. However, this particular system calculates the evapotranspiration values at one location prior to broadcasting, and only the evapotranspiration data and evapotranspiration zones data are broadcast. Thus, each irrigation site receives weather data which may be, or may not be, applicable to the location of a particular irrigation site. This previously available system still is disadvantageous because each site may have distinct characteristics from the other sites and the application of evapotranspiration zone data may be inapplicable to the location of that particular irrigation site.

In view of the foregoing, it will be appreciated that the previously available systems are characterized by significant drawbacks and disadvantages. For example, the decision to irrigate is made at the central computer and not on-site providing inaccurate watering. In addition, the previously available systems do not transmit the weather data but only evapotranspiration values calculated by the central computer which prevents on-site adjustments from being made. Thus, it would be a great advance in the art to provide a system and method which overcomes the aforementioned drawbacks and disadvantages.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE ILLUSTRATIVE EMBODIMENTS

Figure 1:
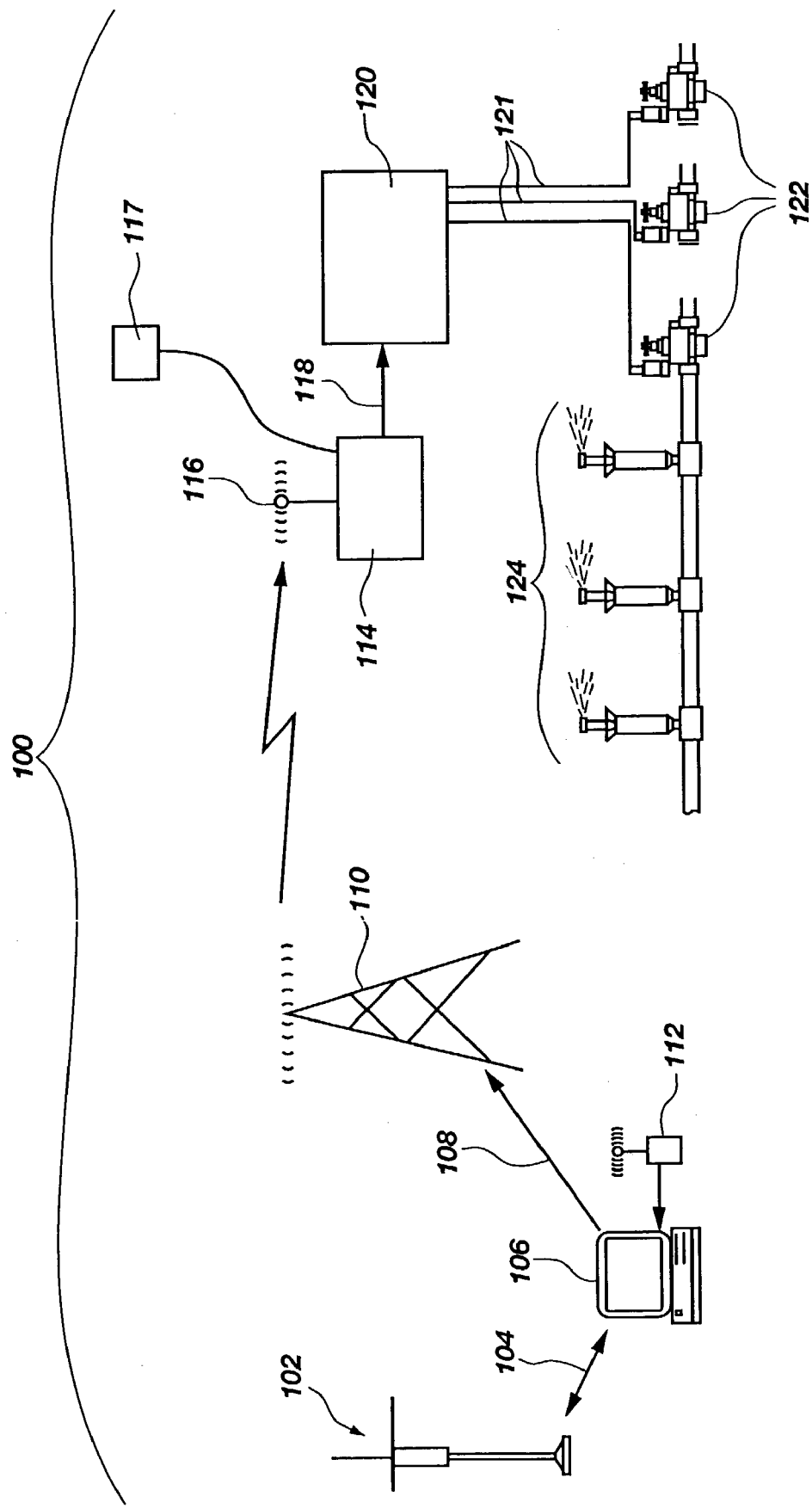
FIG. 1 is a schematic representation of an irrigation control system configured in accordance with the principles of the present invention.

For the purposes of promoting an understanding of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the"

include plural referents unless the context clearly dictates otherwise. As used herein, "comprising," "including," "containing," "characterized by," and grammatical equivalents thereof are inclusive or open-ended terms that do not exclude additional, unrecited elements or method steps.

As will be appreciated from the forgoing discussion, the previously available systems are characterized by several disadvantages that are addressed by the present invention. The present invention minimizes, and in some aspects eliminates, the above-mentioned failures, and other problems, by utilizing the methods and structural features described herein. It will be appreciated that the present invention provides a fully automated system for transmitting weather data collected by a weather station to a receiver directly interfacing with an irrigation controller. The receiver is generally tuned to receive a message from a commercial paging network. The use of a commercial paging network is advantageous because it is preestablished and can be accessed at minimal cost. It will be further appreciated that the evapotranspiration is calculated "on-site" after the weather data is transmitted to each receiver thereby allowing for specific site adjustments to the evapotranspiration value. In addition, the present invention allows all receivers in the same zone to use the same frequency and CAP, i.e., the same pager phone number, thereby allowing non-discrete transmittal of weather data used to calculate the evapotranspiration. In other words, an unlimited number of receivers may operate on the same frequency and CAP code.

The features and advantages of the invention will be further set forth in the description which follows, and in part will be apparent from the description, or may be learned by the practice of the invention without undue experimentation. The features and advantages of the invention may be realized and obtained by means of the instruments and combinations particularly pointed out in the appended claims.

Referring now to FIG. 1, a schematic representation of an irrigation control system, indicated generally at 100, is shown in accordance with the principles of the present invention. The irrigation control system 100 comprises a server 106 including a personal computer running a software package that downloads and stores weather data measured by a weather station 102 or a plurality of weather stations (not explicitly shown in the figures). The server 106 is exemplary of an automated device to perform the functions attributed thereto and will be further described in greater detail below. The weather station 102 is illustratively a commercially available station which will be further described in detail below. One example of a weather station 102 which can be used in accordance with the present invention is the METDATA1™ Weather Station available from Campbell Scientific, Inc., but it will be appreciated that many different systems and structures can function as the weather station 102.

Due to the fact that the weather station 102 is generally located at a location remote of the server 106, a communication path 104 is established between the weather station 102 and the server 106. The communication path 104 is typically via a telephone modem and phone line, to facilitate the downloading of the weather data from the weather station 102 to the server 106, but many different communication structures may be used within the scope of the present invention. For example, the communication path 104 may also be established through the internet, ethernet, radio frequency transmission, satellite, and short haul modems or any other known method to communicate electronic data. At programmed intervals, for example hourly or daily, the server 106 employs the communication path 104 to download the weather data measured and stored by the weather station 102.

Once the server 106 has completed the download, the weather data is stored by the server 106. The server 106 then transmits the weather data and optionally a weather region identifier to a commercial paging service 110 via a second communication path 108. The weather region identifier identifies to what weather region the weather data pertains. The second communication path 108 is typically established between the server 106 and the commercial paging service 110 via the Internet. The second communication path 108 may also be established through a telephone line or any other data transmission means, including cellular phone and other radio frequency technologies. The commercial paging service 110 then broadcasts the weather data to a receiver 116 coupled to or integrated into controller interfaces 114. The receiver 116 may be integrated into the controller interface 114 or separate therefrom. In an alternative embodiment, the commercial paging service 110 may be replaced with some other technology used for transmitting the weather data to the receiver 116. Such exemplary technology may include a cellular phone service or radio transmission service.

After the weather data has been broadcast by the commercial paging service 110 and detected by the receiver 116, the controller interface 114 receives the message. If the message contains a weather region identifier, the controller interface 114 first determines if the message pertains to a weather region in which the controller interface 114 resides.

An illustrative weather region is a geographic region having approximately the same weather patterns through-out, as will be explained in further detail below. The geographic region may vary in size from less than about five square miles, less than about ten square miles, less than about fifty square miles, less that about one hundred square miles, less than about five hundred square miles, less than about one thousand square miles or may be greater than about one thousand square miles, the size of the weather region being selectable by those skilled in the art using the teachings set forth herein. In addition, the geographic area which is encompassed by a weather region may illustratively be the size of the smallest county in the United States or the smallest state in the United States. A weather region identifier is included with the broadcasted weather data. The weather region identifier identifies the particular weather region for which the weather data pertains. In the illustrative embodiments of the present invention, the controller interface 114 has been preprogrammed with a weather region reference which is compared to the weather region identifier included with the weather data. If the two match, then the controller interface 114 processes the information.

If the message is directed to the weather region in which the controller interface 114 resides, the controller interface 114 calculates the evapotranspiration and interfaces with an irrigation controller 120 through a direct link 118, typically one or more wires, to improve the watering schedule. The term "improve the watering schedule" as used herein means to alter the watering schedule as necessitated by the needs of the landscape. For example, during a rainy period, the watering schedule is improved by irrigating less. Conversely, during a dry period, the watering schedule is improved by irrigating more.

The irrigation controller 120 controls a set of valves 122 through control wires 121 to regulate the irrigation output of a plurality of sprinkling heads 124 or other devices used to distribute water. As used herein, the term "irrigation output" refers to the water which flows through the sprinkling heads 124 or other similar devices. It should be understood that the present invention is not limited to any particular type of irrigation or sprinkling system. The present invention can be utilized on residential sprinkling systems that use PVC pipe or large agricultural irrigation systems such as center-pivot systems, traveler irrigation systems, and an irrigation system for smaller acreage. Further, the irrigation or sprinkling systems may be used, without limitation, for residential, commercial, governmental and agricultural purposes.

Figure 2:
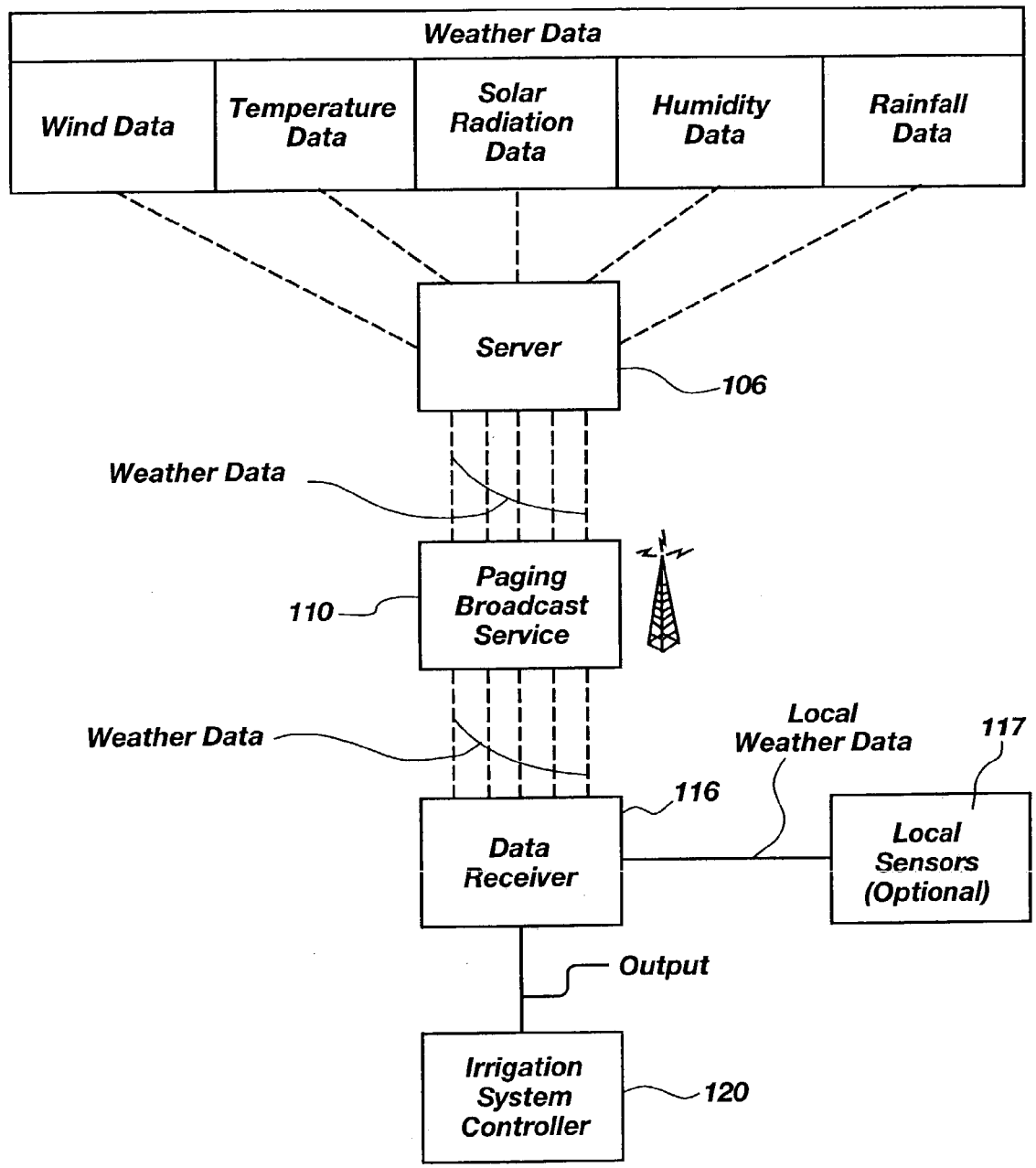
FIG. 2 is a diagram showing the flow of weather data in an irrigation control system configured in accordance with the principles of the present invention.

FIG. 2 is a diagram showing the weather data flow, which was previously described in connection with FIG. 1, in greater detail. The weather data is downloaded or otherwise obtained by the server 106 from the weather station 102. The weather data is then transmitted to the commercial paging service 110. The commercial paging service 110 then broadcasts the weather data over the commercial paging service network to the receiver 116 and controller interface 114 (not shown), which in turn transmits a signal to the irrigation controller 120 based upon the evapotranspiration calculated from the weather data to improve the irrigation output. Optionally, local weather sensors 117, can provide or supplement the weather data broadcasted by the commercial paging service 110. The collection of the weather data by the server 106 and broadcast to the receiver 116 as shown in FIG. 2 typically occurs several times a day, often times hourly. As will be explained below, the weather data generally comprises, without limitation, wind data, temperature data, solar radiation data, humidity data and rainfall data. The data may be averages, accumulated totals, and highs and lows for specified intervals.

Each of the above described components of the irrigation control system 100 will now be described in greater detail below.

Weather Data Collection

Referring now to both FIGS. 1 and 2, the server 106 preferably comprises a personal computer including a monitor, processor, and memory, including RAM and a permanent storage medium, such as a hard disk drive, and software operative to carry out the tasks of the server 106 as described herein. It will be appreciated that running the software on a personal computer is cost effective, but it should be noted, however, that the software can run on any computing device having a processor as is well known in the art. Also, in the illustrative embodiments of the present invention, running on the exemplary personal computer system is an operating system such as WINDOWS® or any other valid operating system. In addition, the personal computer should also include hardware and drivers to support a communication path 104 to the weather station 102 and second communication path 108 to the commercial paging service 110. For example, in the case that the communication path 104 comprises a phone line, typically the personal computer will include an internal or external modem and a manufacturer specific driver as is well known in the art.

While the description supplied herein provides one skilled in the art with all the guidance necessary to make and use the present invention, and in particular the software to operate the server 106, included, and incorporated herein by reference, is Appendix A, which will provide one skilled in the pertinent art further illustrative examples of the structures and techniques used to carry out the present invention. The programming code provided in Appendix A is particularly exemplary of the code used to implement portions of the methods and structures described in connection with FIGS. 1 & 2, as well as exemplary of the other methods and structures described in the disclosure provided herein.

In a separate embodiment of the present invention, the server 106 may download or collect data from sources other than directly from the weather station 102. This may include, without limitation, other computers that have previously downloaded or otherwise having obtained the necessary data. It also may include downloading the weather data from a weather service provider. In addition the data collected need not necessarily be weather data, but may be any other data gathered through telemetry or other means.

It will be appreciated that the structures and apparatus disclosed herein are merely one example of a data collection means for collecting data, and it should be appreciated that any structure, apparatus or system for collecting data which performs functions the same as, or equivalent to, those disclosed herein are intended to fall within the scope of a means for collecting data, including those structures, apparatus or systems for collecting data which are presently known, or which may become available in the future. Anything which functions the same as, or equivalently to, a means for collecting data falls within the scope of the corresponding claim terminology.

Figure 3:
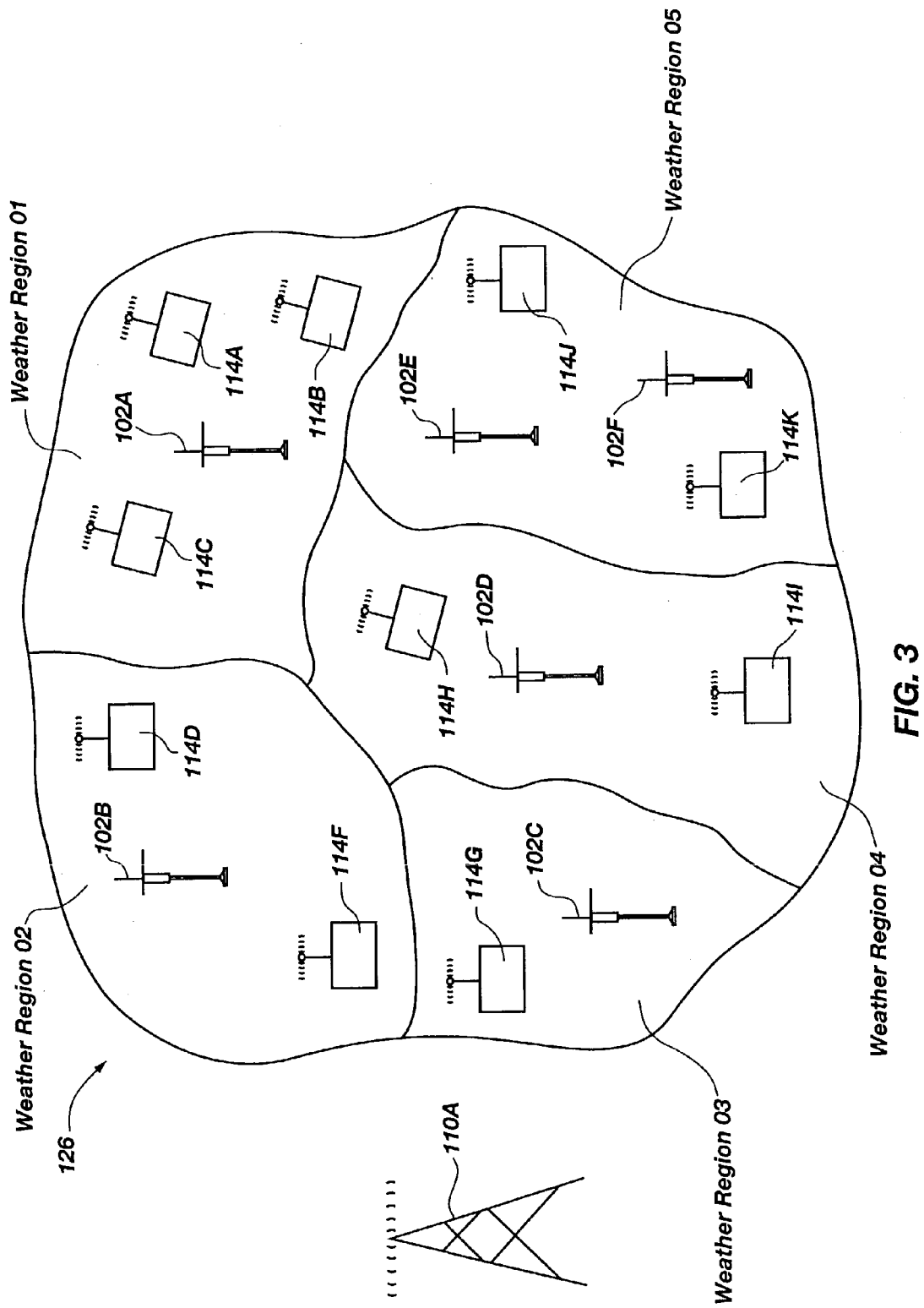
FIG. 3 is a diagrammatic representation of a geographic area divided into distinct weather regions in accordance with the principles of the present invention.

Still referring to FIGS. 1 and 2, for each weather station 102, the server 106 downloads and stores the weather data for the weather region served by the weather station 102. As shown in FIG. 3, a plurality of weather stations 102A-102F can be used to cover a wide geographic area, generally indicated at 126, with the wide geographic 126 area being illustratively divided into smaller weather regions, Weather Regions 01-05, as indicated. The size of each weather region is normally limited by the variability of the weather conditions throughout the region.

In the illustrative examples of the present invention represented in FIGS. 1 and 2, the weather conditions measured by a weather station 102 serving a particular weather region should adequately represent, as closely as possible, the weather conditions throughout the entire weather region. A controller interface 114 may however, optionally receive on-site weather data from local weather sensors 117 that are directly connected to the controller interface 114, or alternatively the irrigation controller 120, to supersede any weather data gathered by the weather station 102.

It should be noted, that a weather region is typically served by a single weather station 102 but more than one may be used to provide more accurate data. For example, as shown in FIG. 3, Weather Region 05 has two weather stations 102E and 102F located therein. In this illustrative case, the data from the two weather stations, 102E and 102F, could be averaged or otherwise combined by the server 106 prior to broadcasting to thereby provide more accurate data.

Scattered throughout the weather regions may be a plurality of controller interfaces, 114A through 114K, in direct communication with an irrigation controller 120 having control of an irrigation system (neither shown explicitly in FIG. 3). A weather region may only have one controller interface or a plurality of controller interfaces. For example, Weather Region 03 only contains a single controller interface 114G while the other regions each have a plurality of controller interfaces. Each controller interface, 114A-114K, relies on the respective weather station(s), 102A-102F, in its weather region to supply the appropriate weather data. It should be understood that while not shown, each controller interface 114A-114K in FIG. 3 is connected to an irrigation system comprising an irrigation controller 120, control wires 121, valves 122 and sprinkling heads 124. Further each of the controller interfaces 114A-114K also has a receiver to receive transmissions.

It should be noted that FIG. 3 is provided merely as an example to assist in the understanding of the illustrative embodiments of the present invention and should not be construed as limiting the scope of the present invention in anyway. The weather regions illustrated in FIG. 3 are for exemplary purposes only, and weather regions may vary in shape, size and number. In addition, an arbitrary geographic area may be comprised of a single weather region or a plurality of weather regions.

Referring again to FIG. 1, the weather station 102 illustratively comprises one or more sensors for measuring weather conditions and a data logger to record the weather measurements. The weather station 102 should be located in a site that accurately represents the weather region which it serves. Weather patterns, elevation, geography, exposure, obstructions and surrounding landscape all play a role in determining the limits of accuracy representing a weather region. Most often, the weather station 102 should be able to measure the solar radiation, air temperature, humidity, wind speed and rain fall. Optionally, the weather station 102 may make additional measurements, such as soil temperature, barometric pressure, and vapor pressure deficit.

An example of some of the sensors required are a pyranometer, a thermometer, an anemometer, a tipping bucket rain gauge, and a humidity sensor. It will be appreciated that sensors used to collect the above data are well known to those skilled in the art and any sensor now known or known in the future that collects the required data should be considered within the scope of this invention. Shown in Table 1 are the model numbers of illustrative sensors offered by Campbell Scientific, Inc.

TABLE 1

| Sensor | Model No. |
| --- | --- |
| Pyranometer | CM3 Pyranometer |
| Thermometer | IRTS-P Precision Infra-red Thermocouple Sensor |
| Anemometer | 034B Wind Set |
| Tipping bucket rain gauge | TE525MM Tipping Bucket Rain Gage |
| Humidity sensor | HMP45C Temperature and Relative Humidity Probe |

As mentioned above, the weather station 102 also includes a data logger (not shown) to record the weather data once it has been measured by the senors. Data loggers are well known to those with skill in the art in collecting and storing data for a wide variety of applications. Generally, the data logger should time stamp each set of weather data that is measured. Data loggers also may have hardware and software, such as a modem, to receive or place calls to facilitate in transfer of the weather data through the communication path 104. The data logger may also be capable of providing averages, minimums, or maximums for weather data over a set period of time. Campbell Scientific, Inc. manufactures a data logger, model no. CR10X Measurement and Control System, that is well-suited for use in embodiments of the present invention described herein.

It will be appreciated that the weather station 102 and server 106 described herein is merely one example of a weather data collection means for collecting weather data, and it should be appreciated that any structure, apparatus or system for measuring and collecting weather data which performs functions the same as, or equivalent to, those disclosed herein are intended to fall within the scope of a weather data collection means, including those structures, apparatus or systems for measuring and collecting weather data which are presently known, or which may become available in the future. Anything which functions the same as, or equivalently to, the means for measuring weather data falls within the scope of the corresponding claim terminology. For example, using more than one weather station 102 for a region to collect the weather data is within the scope of the present invention. It is also within the scope of the present invention to collect weather data via satellites.

It is within the scope of the present invention for the server 106 to store the following information for each weather station 102: the location (address, city and state), the weather region served, phone number, owner, latitude and longitude, elevation above sea level, height of the anemometer, and restrictions on contact time. A customized network map showing the location of each weather station 102 may also be stored on the server 106.

Each weather region is assigned a weather region identifier, which is stored on the server 106. By way of example only and not by limitation, referring to FIG. 3, each of the weather regions has been assigned a weather region identifier between 01-05. The weather region identifier associated with each weather region is included with the weather data downloaded from the applicable weather station 102 when broadcast through the commercial paging service 110, as will be further explained below. In this manner, only the controller interfaces 114 lying in that particular weather region will process or accept the broadcasted weather data for the region in which the controller interface 114 lies.

In some cases, the server 106 may be configured to access pre-programmed weather stations that are owned and operated by other parties not associated with the owner of the server 106. The server 106 should be able to access multiple weather stations, even if the weather stations are running different programs and utilize different protocols and standards to communicate with other devices and systems. Significantly, each weather station 102 should collect and store adequate data to calculate the evapotranspiration, although as will be further explained below, on-site weather data may be used instead of the data collected at the weather station. This data may include: average air temperature, maximum air temperature, minimum air temperature, average relative humidity, average solar radiation, average wind speed and rain fall. The weather station 102 preferably should collect this data on an hourly basis, but this is not absolutely necessary and other time periods, for example, including every second, every minute, and every day, can also be used within the scope of the present invention. It will be appreciated by those skilled in the art that various different types of weather stations 102 may be used in accordance with the principles of the present invention, such as a weather stations produced by Campbell Scientific, Inc. used for many applications including those in the landscape industry. There are many existing weather stations that can be used in the present system 100 which can be adapted to be accessed by the server 106.

For the reasons explained above, a configuration file is generally created for each weather station 102 accessed by the server 106. The configuration file is a software file which interfaces with the program running on the weather station 102 and allows the server 106 to communicate with that particular weather station 102. The configuration file may be provided by the owner or operator of the weather station 102. It also may be necessary to customize the configuration file pursuant to the program running the weather station as is well known in the art and as can be carried out by those skilled in the art.

As mentioned earlier in connection with FIGS. 1 and 2, a communication path 104 between each weather station 102 and the server 106 must be established and properly configured in order to download the weather data. In some cases, a dial-up modem is used to access and download the weather data from the weather station 102. The modem is generally connected to a serial port on the personal computer as is well known in the art and may be installed internally or externally or may be any type of suitable communication device, either now known or which becomes available in the future. The dial-up number of the weather station 102 must also be obtained and stored by the server 106 so that the weather station 102 can be contacted.

Other communication paths, such as radio, pager, satellite and even manual input through a keyboard may also be used to receive the weather data from the weather station 102 within the scope of the present invention. It will be appreciated that the structure and apparatus disclosed herein for establishing a communication path 104 between the weather station 102 and server 106 are merely illustrative examples of a means for downloading weather data, and it should be appreciated that any structure, apparatus or system for downloading weather data which performs functions the same as, or equivalent to, those disclosed herein are intended to fall within the scope of a means for downloading weather data, including those structures, apparatus or systems for downloading weather data which are presently known, or which may become available in the future. Anything which functions the same as, or equivalently to, a means for downloading weather data falls within the scope of the corresponding claim terminology.

The server 106 should be configured to automatically utilize the communication path 104 with the weather station 102 and download the most recent weather data based upon a preprogrammed schedule. Typically, the weather data will be downloaded hourly, but the download schedule may also be of any length of time that adequately provides the weather data to be useful in the irrigation process, such as daily. Other applications of the present invention may only require weekly downloads of the weather data to the server 106. The downloading of the weather data should be scheduled to occur soon after the weather station 102 measures and stores the data. If others are accessing the weather station 102, the communication schedule should be coordinated, if possible, to verify that no conflicts exist.

The server 106 should also be able to perform retries in the event of a busy signal or other interruption in the downloading of the weather data from the weather station 102. If a plurality of weather stations are used, then the server 106 should automatically establish a communication path 104 with each weather station 102 pursuant to the information contained in configuration file. Typically, each weather station 102 will have its own access telephone number.

The server 106 may also monitor and record the data collection status of the weather station 102 or multiple weather stations as shown in FIG. 3. The server 106 may provide for each weather station 102 the date and time of the next automatic download of weather data, the date and time of the last download, the last attempt to collect weather data, and any errors associated with the data downloading of the weather data.

Once the weather data has been downloaded from a weather station 102 and stored in the database, the server 106 may output the data in a variety of formats, including, posting to a website, sending the data FTP to a web server, printing customized reports, and broadcasting the weather data to the controller interface 114 through a commercial paging service 110.

Broadcasting of the Weather Data

Once the weather data has been downloaded and stored from the weather station 102 through the communication path 104, the server 106 can broadcast it to one or more controller interfaces 114 through a commercial paging service 110. As mentioned previously, the controller interface 114 is coupled with the receiver 116 for receiving messages broadcast in the frequency assigned by the commercial paging service 110. The receiver 116 may be integrated into the controller interface 114 or as a separate stand alone unit coupled by a cable. The controller interface 114 uses the weather data to calculate the evapotranspiration. Illustrative examples of the controller interface 114 include a processor to perform any needed calculations.

Using the evapotranspiration, the controller interface 114 interfaces with the irrigation controller 120 to improve irrigation. The controller interface 114 may also receive weather data from one or more on-site sensors generally shown as 117 on FIG. 1 directly connected to the controller interface 114. In this case, the on-site weather data supercedes any remote weather data from the weather station 102 sent via the commercial paging service 110, if the data is sent at all. It will be appreciated that this provides more accurate data when calculating the evapotranspiration for the site specific locations.

As mentioned, the irrigation control system 100 utilizes a commercial paging service 110 to broadcast the weather data to the controller interface 114 over the airwaves. For the purposes of this invention, the term "over the airwaves" means a wireless transmission in any frequency from a transmitter to a receiver. In general, commercial paging service providers have built in communication networks that normally send numeric or alphanumeric messages to digital pagers. Pagers are basically radio receivers, tuned to a paging carrier's frequency with a unique CAP code (or serial number). The CAP code allows multiple receivers to operate on the same frequency. All the receivers within the associated geographic area pick up the signal, but only the receivers with the proper CAP code will process the signal.

A commercial paging service provider is generally used for personal messaging services and usually comprises a centralized message-processing center and communication systems that connect to radio transmission towers. From the towers of this illustrative example, the message is broadcast in 900 MHz paging frequency. It should be noted, however, that any broadcast frequency is acceptable. Further, the use of towers is not required. This message could be broadcast from a satellite. The centralized message-processing centers generally accepts messages in one of the following manners: direct calls to the paging number, electronically via the Internet, and live operator assisted. The actual transmission sites for the commercial paging service 110 are generally located in all major metropolitan areas and many minor metro areas as well as rural locations. The communication systems used between the centralized message-processing center and the broadcast towers include the use of phone, radio, and satellite systems. One example of a commercial paging service 110 which has particular application with the present invention is available from Metrocall, Inc., a nationwide provider of paging services.

Once a commercial paging service 110 has been identified and the appropriate paging service selected, it is preferred to establish the communication path 108 between the server 106 and the commercial paging service 110 to allow automated message delivery. The communication path 108 is preferably, but not necessarily, established through the Internet. The Internet, or successive data transmission networks, is preferred because it allows low cost automated transmission to the commercial paging service 110. Thus, a service contract may need to be acquired from an Internet service provider to provide the communication path 108.

In the illustrative embodiment of the present invention shown in FIG. 1, the commercial paging service 110 assigns a phone number to which the messages will be directed. The server 106 is capable of generating a message containing the weather data using the pager phone number and protocol provided by the commercial paging service 110 to transmit the message. Typically, the message will contain the weather data and weather region number to which the weather data applies.

It will be appreciated that the structure and apparatus disclosed herein is merely one example of a broadcasting means for broadcasting the weather data, and it should be appreciated that any structure, apparatus or system for broadcasting the weather data which performs functions the same as, or equivalent to, those disclosed herein are intended to fall within the scope of a broadcasting means, including those structures, apparatus or systems for broadcasting which are presently known, or which may become available in the future. Anything which functions the same as, or equivalently to, a broadcasting means falls within the scope of the corresponding claim terminology.

Once the message is received by the central messaging center of the commercial paging service 110, it is broadcast through the appropriate transmission towers. It is preferable that the broadcast use the MOTOROLA® FLEX® paging protocol, but this may vary depending on the particular commercial service provider 110 selected. The commercial paging service 110 knows where to send the message based upon the pager phone number to which the message is sent.

It is generally only necessary to get one pager number to transmit the weather data to all of the controller interfaces 114 in a given geographic area, even where the controller interfaces 114 reside in several different weather regions. Each receiver 116 coupled to or integrated into a controller interface 114 is programmed to the same radio frequency and CAP code associated with the pager phone number. In other words, each controller interface 114 (receiver 116) will receive all of the messages sent to the pager phone number. However, each controller interface 114 is programmed to only process the weather data associated with the weather region in which the controller interface 114 resides. This is accomplished by the use of the weather region identifier assigned to each weather region. The server 106 includes with the message containing the weather data the weather region identifier for which the weather data pertains. Thus, the controller interface 114 can filter (and avoid processing) any messages not related to the weather region in which it resides.

It will be appreciated that the receiver 116 and controller interface 114 disclosed herein is merely one example of a receiving means for receiving the weather data, and it should be appreciated that any structure, apparatus or system for receiving the weather data which performs functions the same as, or equivalent to, those disclosed herein are intended to fall within the scope of a receiving means for receiving weather data, including those structures, apparatus or systems for receiving weather data which are presently known, or which may become available in the future. Any system or structure which functions the same as, or equivalently to, a receiving means for receiving weather data falls within the scope of the corresponding claim terminology.

Thus, it will be appreciated that weather data may be sent to multiple controller interfaces 114 via the same pager phone number. Thus, there is no need to have a dedicated pager phone number for each controller interface 114. It also eliminates the need to make separate broadcasts to each controller interface 114. It will be further appreciated that using only one pager phone number to broadcast to multiple controller interfaces 114 is cost effective since an operator will only pay for the one pager number even though it is within the scope of the present invention that one or a thousand or more controller interfaces 114 may receive weather data through that pager number.

For example, referring again to FIG. 3, suppose that weather data for Weather Region 01 has been downloaded from weather station 102A and sent to the commercial paging service 110A by a server 106 (not explicitly shown). The commercial paging service 110A could broadcast the message to all of the controller interfaces 114A-114K in Weather Regions 01-05. While all of the controller interfaces 114A-114K in all of the regions would receive the message, only the controller interfaces 114A-114C in Weather Region 01 would actually process the weather data, that is, use the weather data to improve irrigation schedule. This is possible because the controller interfaces 114A-114K have been preprogrammed with a weather region reference. The weather region reference identifies the weather region in which the interfaces reside. When data is received, each controller interface 114A-114K will compare the weather region identifier included in the message with the preprogrammed weather region reference. If there is a match, then the controller interface 114A-114K will process the data. If there is no match, then the controller interface 114A-114K will reject the data because it pertains to a weather region apart from the weather region in which the controller interfaces 114A-114K resides.

Referring back to FIGS. 1 and 2, it should be noted, that in order to send a message, the server 106 may optionally encode the weather data and any other information being sent to the controller interface 114. Encoding the data may simply involve converting the data from ASCII values to binary values. Binary data tends to be more efficient, allowing the transmission of the same data with further characters. Encoding the weather data is particularly useful where the commercial paging service charges per character. By reducing the number of transmitted characters, the operating costs will be reduced. It will be appreciated that data encoding techniques are well known in the art any viable encoding technique can be utilized in accordance with the principles of the present invention.

Once the weather data is ready to transmit, the server 106 formats the data using the appropriate protocol as determined by the commercial paging service 110, such as the Wireless Communication Transfer Protocol as explained in The Wireless Communication Transfer Protocol published Jun. 6, 2000 by the Personal Industry Communication Association (www.pcia.com) which is incorporated herein by reference in its entirety. It should be noted that any protocol used in the industry is within the scope of the present invention. Once the data is ready to transmit, the server 106 then generates a message containing the weather data and any other information, such as a weather region identifier, properly formatted, and sends it to the commercial paging service 110 via communication path 108.

The weather data should be sent to the commercial paging service 110 as soon as possible after it has been downloaded from the weather station 102 by the server 106. This ensures that the irrigation controller 120 has the most up to date weather data. If the weather data is being downloaded hourly, the server 106 should send the weather data hourly through the commercial paging provider 110, but other schedules are also within the scope of the present invention.

The server 106 may also utilize a paging queue to manage the messages sent to the commercial paging service 110. The server 106 also verifies system operation by monitoring an optional feedback receiver 112 connected to the server 106.

The feedback receiver 112 may be utilized in conjunction with the server 106 to monitor and verify that all messages are actually broadcasted by the commercial paging service 110. The feedback receiver 112 is normally, but not necessarily, connected to the personal computer via a serial cable connected to one of the COM ports. The feedback receiver 112 can utilize the same receiver 116 as coupled or integrated into the controller interface 114. It should be noted that the system 100 can function without the feedback receiver 112.

The feedback receiver 112 should be mounted near the server 106. The feedback receiver 112 receives and monitors broadcasts of messages sent to the commercial paging service 110. When a message is detected by the feedback receiver 112, the server 106 verifies that the message is complete and accurate by comparing it to the message actually sent. The feedback receiver 112 can be used to monitor the time between a message being sent and broadcast. If a valid feedback message is not received after a programmed period of time, such as 12 minutes, the original message may be resent by the server 106. The server 106 can be programmed to resend the message up to a specified number of times, i.e., three times. In the event that duplicate messages are sent, the controller interfaces 114 should be programmed to ignore a duplicate message. When feedback is matched with a sent message, it is noted and stored.

The server 106 may also be programmed to validate the data before it is actually sent to the commercial paging service 110. The server 106 can be preprogrammed to compare the data downloaded from the weather station 102 against limits set by the user. If a message contains data that is outside the defined limits, the message can be posted in an error log and the message is not sent. Data outside of the set limits may indicate a problem with a sensor at the weather station 102 or data corruption. The defined limits may include maximum and minimum values for a particular measurement.

Receipt of the Weather Data

As described previously, each controller interface 114 is coupled to or has an integrated receiver 116 and direct link 118 to an irrigation controller 120. The broadcast frequency and CAP code monitored by the receiver 116 is dictated by the particular commercial paging service 110 utilized in accordance with the principles of the present invention. In addition, the protocol used by the commercial paging service 110, normally the MOTOROLA® FLEX® protocol, should be identified in order to "understand" the messages.

Figure 4:
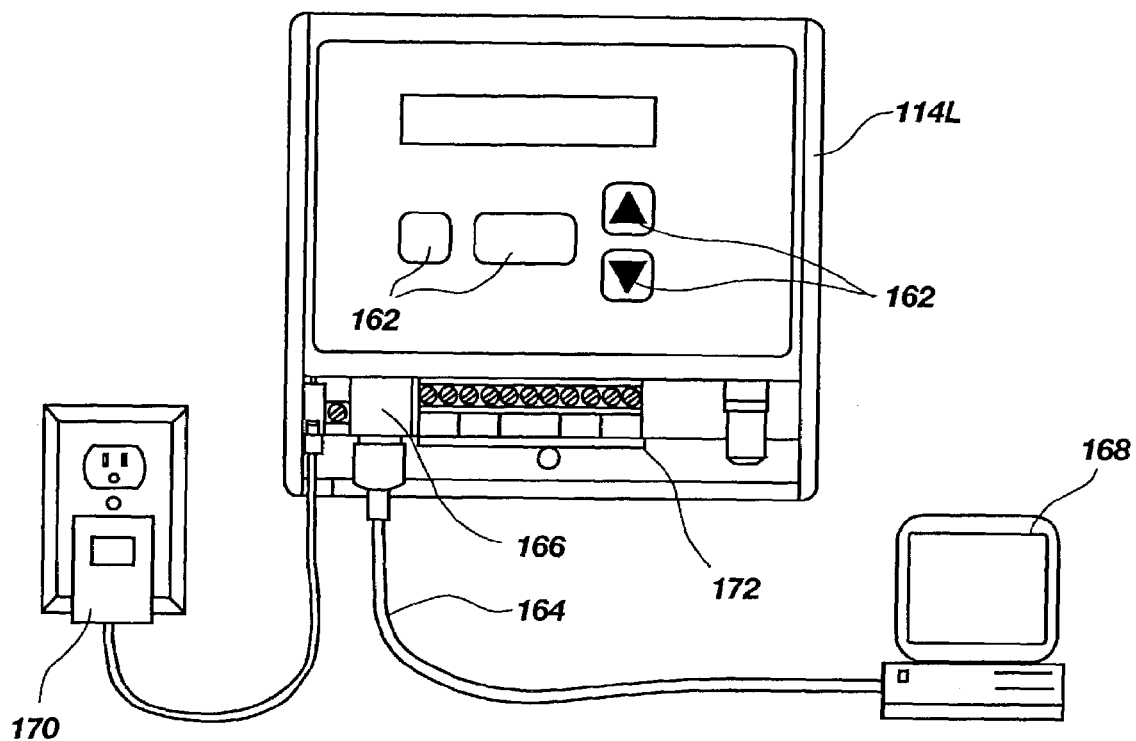
FIG. 4 illustrates on illustrative embodiment of a controller interface connected to a computer in accordance with the present invention.

Additionally, each controller interface 114 must be programmed according to the needs of the project where it is installed. As shown in FIG. 4, an exemplary controller interface 114L can be programmed directly, i.e., from keys 162 located on the controller interface 114L or through a cable 164, such as an RS232 connection, linking the controller interface 114L from a connector 166 directly to a computer 168 running software to assist in the programming process as shown in FIG. 4. In addition, the cable 164 can be used to connect the controller interface 114L to an irrigation controller 120. The field wire connections 172 can also be used to connect the controller interface 114L to an irrigation controller as will be further explained below. The controller interface 114L may need to be connected to a power supply 170 during programming. The power supply 170 is also needed when installed for use.

One example of a controller interface 114L suitable for the purposes described herein is available from Irrisoft, Inc. and in particular model no. WR-7, whose internal schematic diagrams are shown in FIGS. 5A-5E. It should be noted that the WR-7 may also be configured to serve as a feedback receiver 112. It will be appreciated that the embodiment of the present invention represented by the schematic diagrams provided in FIGS. 5A-5H are merely one example of the present invention and are provided as examples and are not intended to be limiting of the scope of the present invention. Further information regarding the use and installation of model no. WR-7 is found in the WR-7 Activation User Guide and Model WR-7 User Guide available from Irrisoft, Inc., both of which are incorporated herein in their entirety.

While the description supplied herein provides one skilled in the art with all the guidance necessary to make and use the present invention, and in particular, the information needed to program the controller interface 114L, attached hereto, and incorporated herein by reference, is a Programming Code Appendix B, which will provide one skilled in the pertinent art further illustrative examples of the structures and techniques used to carry out the present invention. The programming code provided in the attached Programming Code Appendix B is particularly exemplary of the code used to implement portions of the methods and structures described in connection with FIGS. 1 & 2, as well as exemplary of the other methods and structures described in the disclosure provided herein.

In addition, it is within the scope of the present invention that the controller interface 114 be able to decode any encoded message sent by the server 106 in a encoded format. In this regard, the controller interface 114 serves as a means to decode any data sent by the server, but many different structures now known, or which may become available in the future, can be used to carry out the described function.

In accordance with one aspect of the present invention, the controller interface 114 is programmed with a weather region reference, i.e., the weather region identifier for the weather region that most closely represents its location in terms of weather conditions. Generally, this is determined by the closest weather station 102. The weather region reference is needed because information for more than one weather region may be broadcasted using the same frequency and CAP code. In this manner, the controller interface 114 can distinguish between applicable and non-applicable messages. If the weather region identifier matches the weather region reference preprogrammed into the controller interface 114, then the controller interface 114 will process that message.

It is also in accordance with another aspect of the present invention that the controller interface 114 be programmed to use the broadcasted weather data or site-specific values. As discussed above, in some cases, weather sensors 117 may be located on-site to provide more accurate data. For example, the controller interface 114 may have temperature and wind sensor inputs that may provide on-site values that can be used in the evapotranspiration calculation. In this configuration, the controller interface 114 could use local rain, temperature and wind combined with regional humidity and solar radiation to calculate evapotranspiration. Solar radiation and humidity sensors are more expensive and require higher maintenance and therefore are not generally included on-site. However, solar radiation and/or humidity sensors may also be provided on-site, which is within the scope of the present invention. In these cases, the controller interface 114 will use the data collected on-site in lieu of any transmitted data, if transmitted at all. In addition, a specific crop coefficient may be programmed into the controller interface 114, in accordance with another aspect of the present invention. This allows for an adjustment of the evapotranspiration value based upon the type of crop at the site. Otherwise, the controller interface 114 may accept a crop coefficient broadcast from the server 106 or no crop coefficient at all.

Further in accordance with another aspect of the present invention, the controller interface 114 may also be programmed with site specific adjustments to the data received from the weather station 102. In this manner, the controller interface 114 can deal with known differences between the weather station 102 location and on-site conditions. Wind is often the biggest variable from one site to another. The user will be able to enter a wind adjustment factor to deal with any variation. Other weather parameters may remain more constant over a wider area. But, adjustments to any weather data is within the scope of the present invention. For example, the controller interface 114 may be programmed to adjust any value received by a specified percentage.

Referring again to FIG. 1, the irrigation controller 120 can be selected from among the wide variety that are commercially available, ranging from very small simple low-cost devices to highly sophisticated devices. To create a watering schedule to be carried out using an irrigation controller, there are several considerations that may be common to all controllers, such as:

1. How often does a particular valve (in an irrigation system) water (frequency)?
2. What time of day does a watering cycle occur?
3. How long does a valve stay on (run-time)?

It will be appreciated that the irrigation controller 120 disclosed herein is merely one example of a irrigation controller means for controlling an irrigation system, and it should be appreciated that any structure, apparatus or system for controlling an irrigation system which performs functions the same as, or equivalent to, those disclosed herein are intended to fall within the scope of a irrigation controller means for controlling an irrigation system, including those structures, apparatus or systems for controlling irrigation systems which are presently known, or which may become available in the future. Any structure which functions the same as, or equivalently to, as an irrigation controller means for controlling an irrigation system falls within the scope of the corresponding claim terminology. In addition, the term irrigation controller means is intended to include within its scope structures such as valves, pipes and sprinkler heads.

In one exemplary embodiment of the present invention, the controller interface 114 desirably may provide several different outputs, one of such outputs being usable by nearly all irrigation controllers available in the marketplace. It will be appreciated that the ability to provide several different outputs from a single controller interface 114 is an improvement over the prior art. The type of output used is dependent upon the input accepted by the irrigation controller 120. The controller interface 114 can be configured or programmed to provide a control signal in a control signal output mode that corresponds to the input accepted by the irrigation controller 120. It should be noted that the control signal may be a signal transmitted to the irrigation controller 120 but is not limited thereto. A control signal may also be a controllable interruption in a wire leading to or from the irrigation controller 120.

As shown in FIGS. 5J-5N, the field wiring connections 172 allow for several different configurations, each configuration allowing a different output. It will be appreciated that having one device capable of a plurality of different output modes is advantageous over the prior art. It should also be noted that the controller interface 114 is not limited to only receiving weather data but may also receive pre-calculated evapotranspiration values or any other data necessary to calculate a watering indicator for improving irrigation output.

Generally, the controller interface 114 will output one or more of the following signals, depending on how it is configured by the user:

1. ET pulsed output;
2. ET enable;
3. ET trigger or ET start;
4. Rain pulse output;
5. Weather interrupts;
6. Direct data transfer; and/or
7. TTL.

These output signals will be discussed more fully below. It should be understood that it is possible for the controller interface 114 to output one or more of these control signals at the same time as will be shown below. In particular, it is common to use weather interrupt in combination with the other control signals.

Figure 5A:
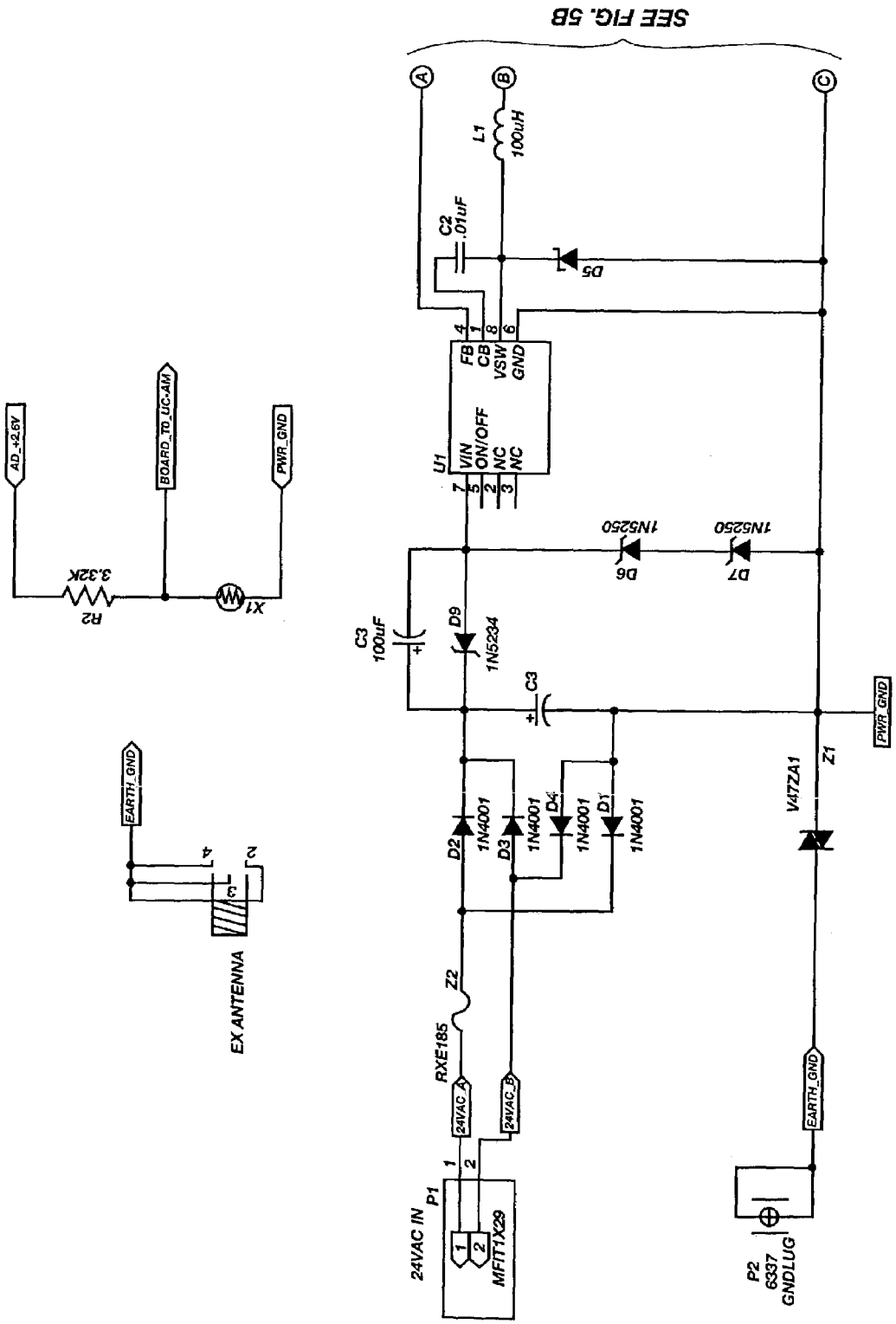
FIGS. 5A-I are schematic diagrams of one exemplary controller interface and receiver in accordance with the present invention.
Figure 5B:
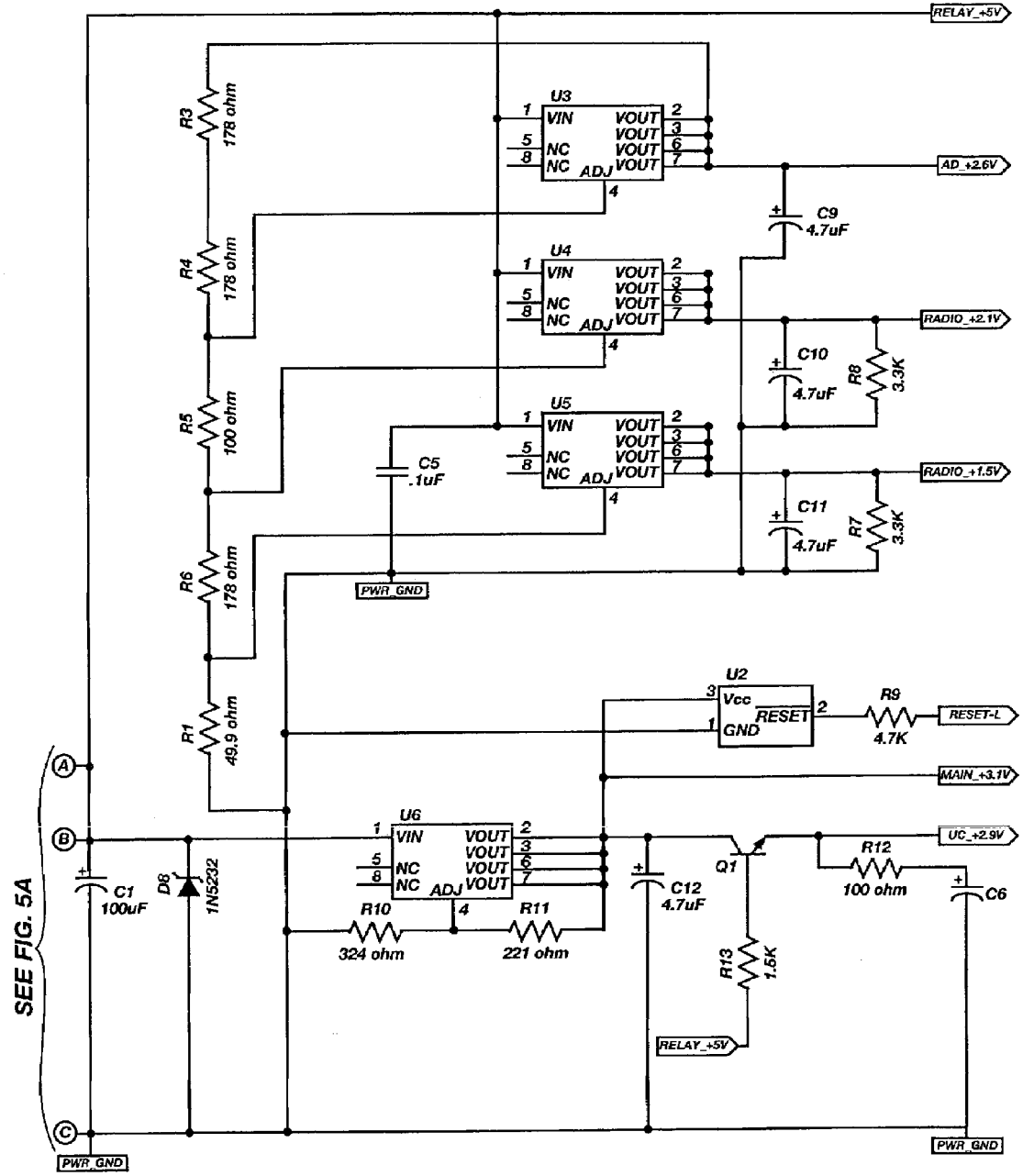
Figure 5C:
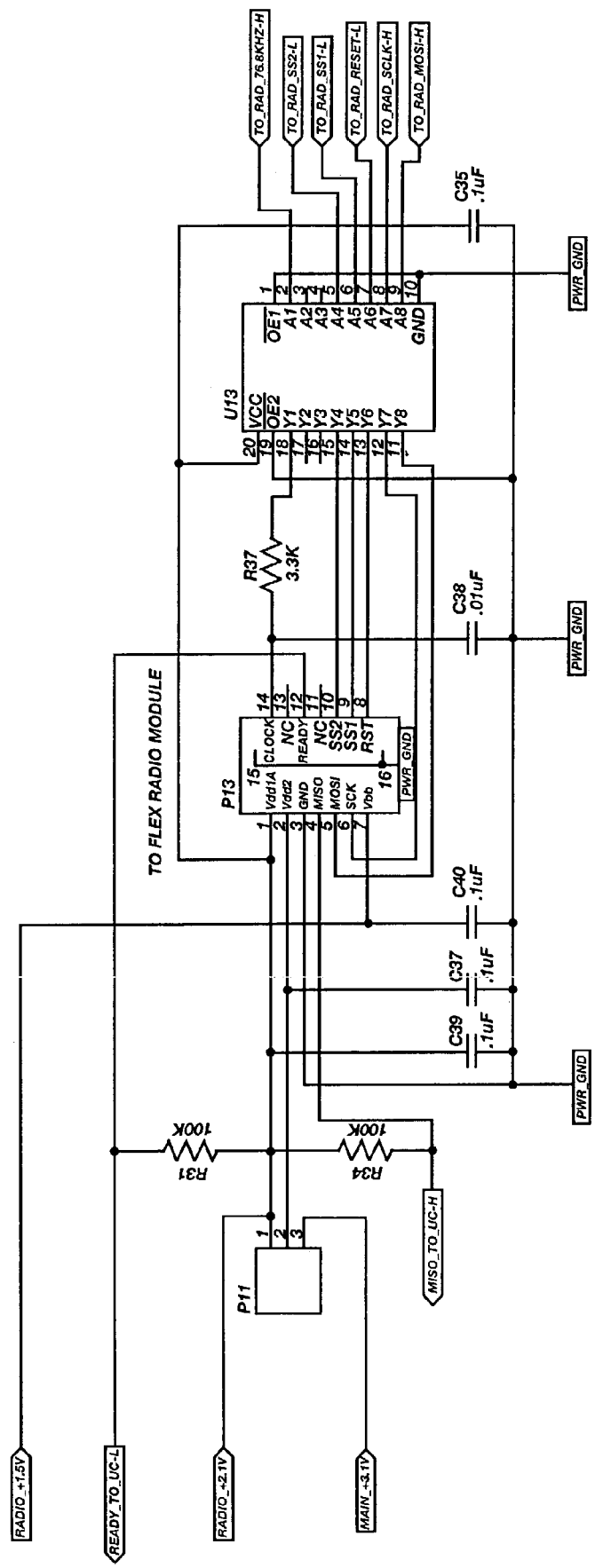
Figure 5D:
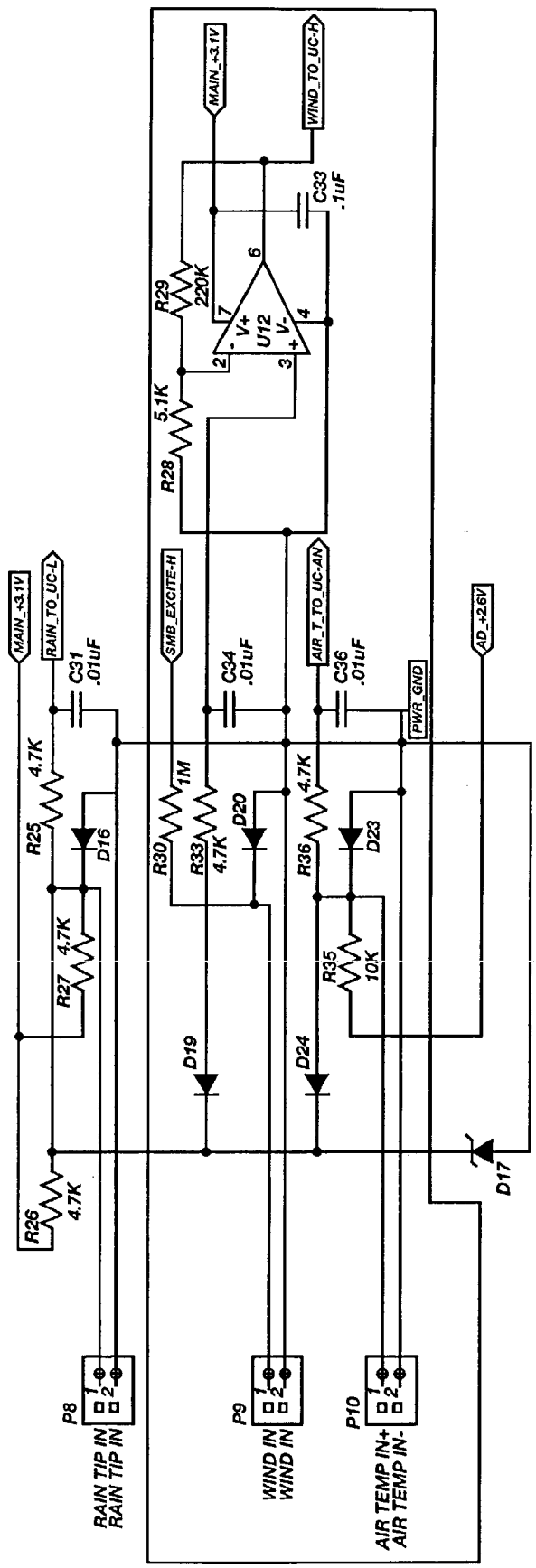
Figure 5E:
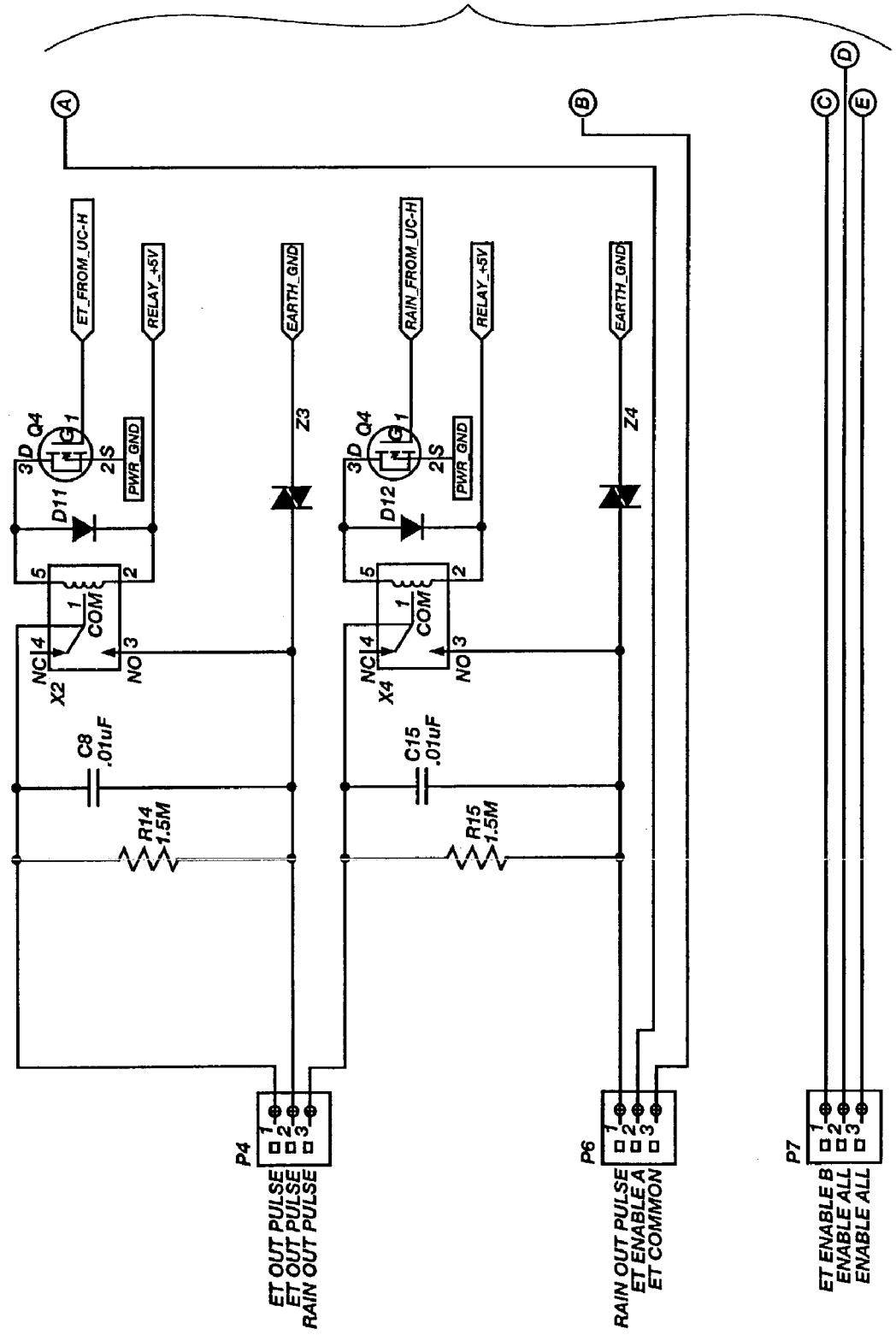
Figure 5F:
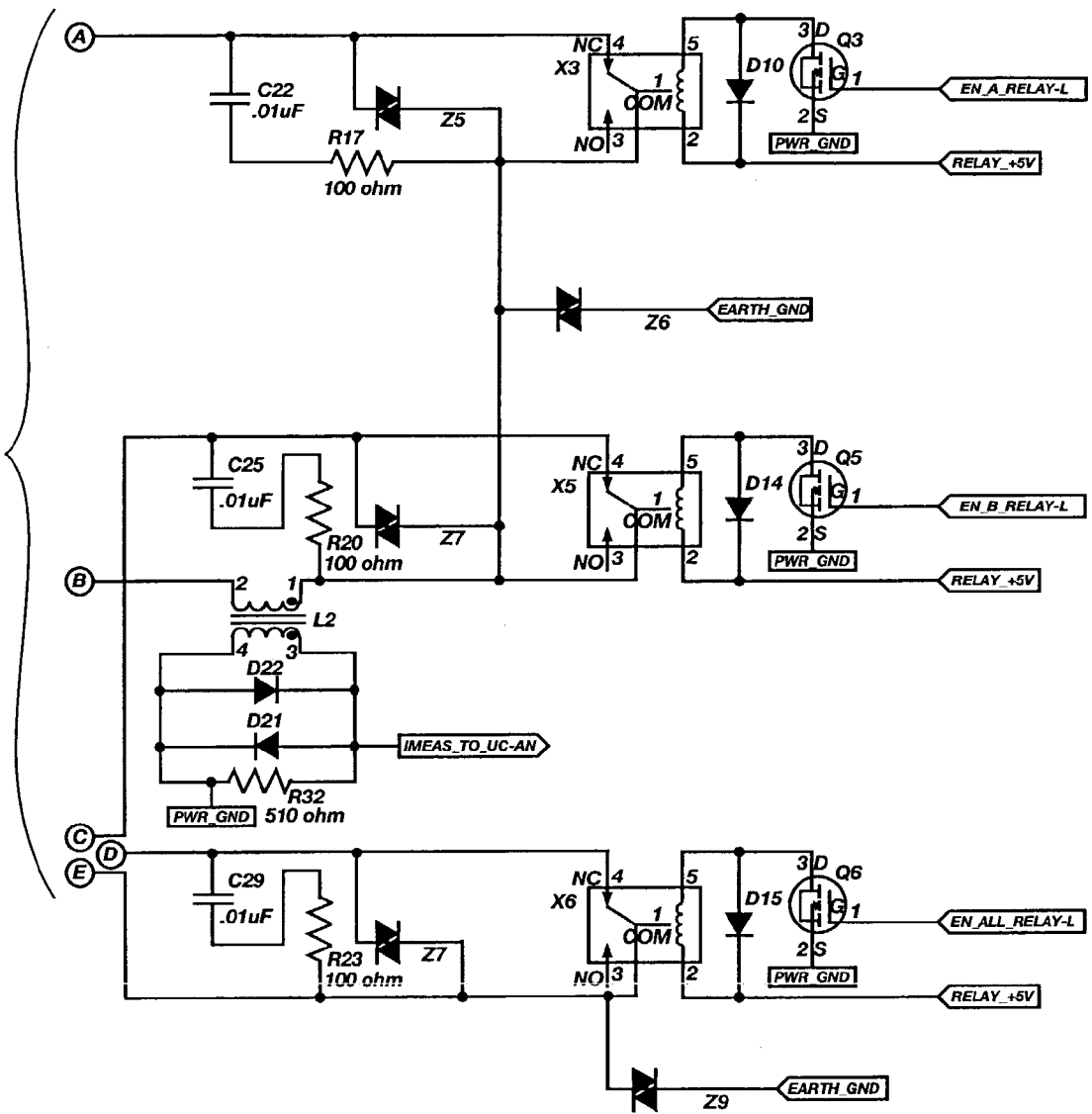
Figure 5G:
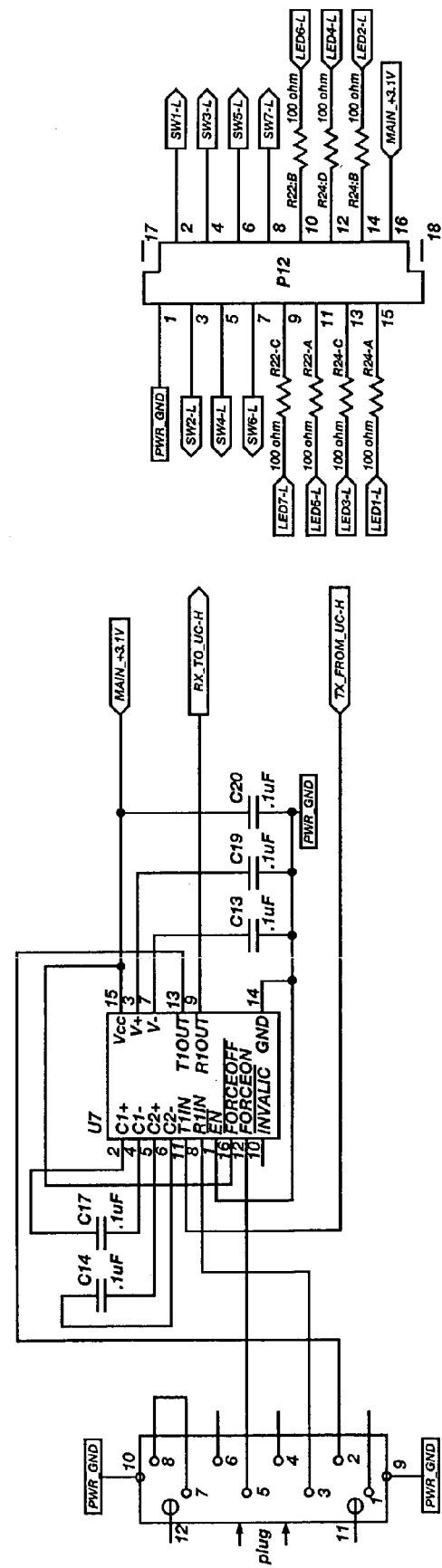
Figure 5H:
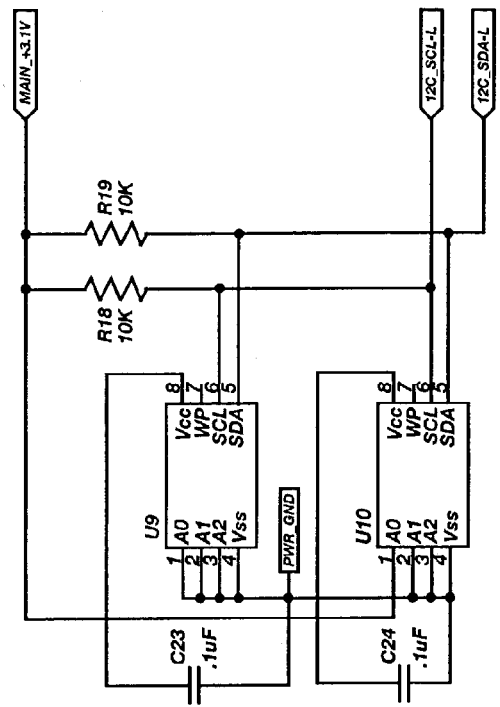
Figure 5H:
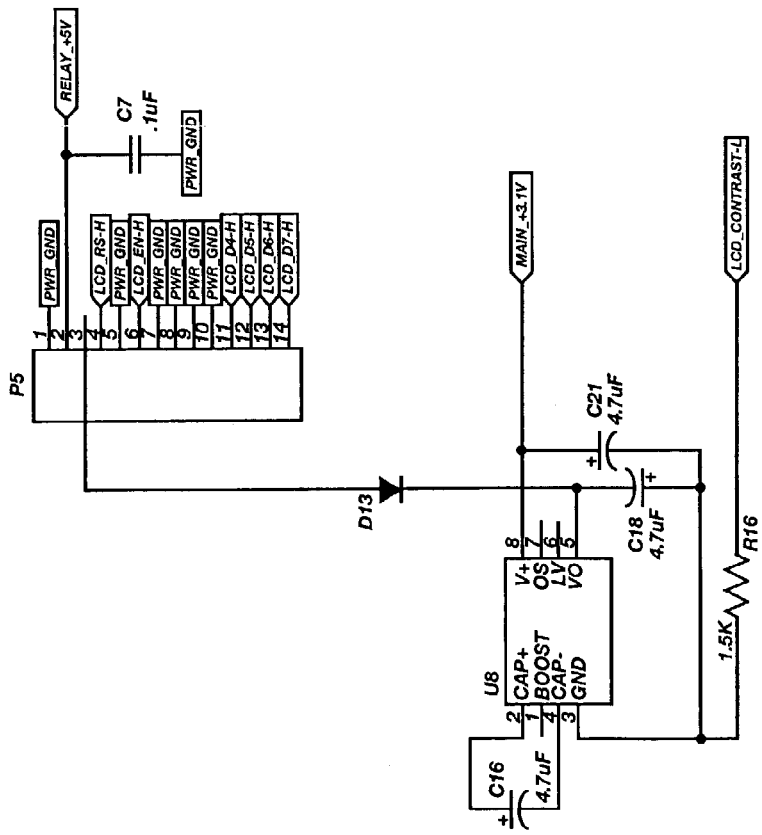
Figure 5I:
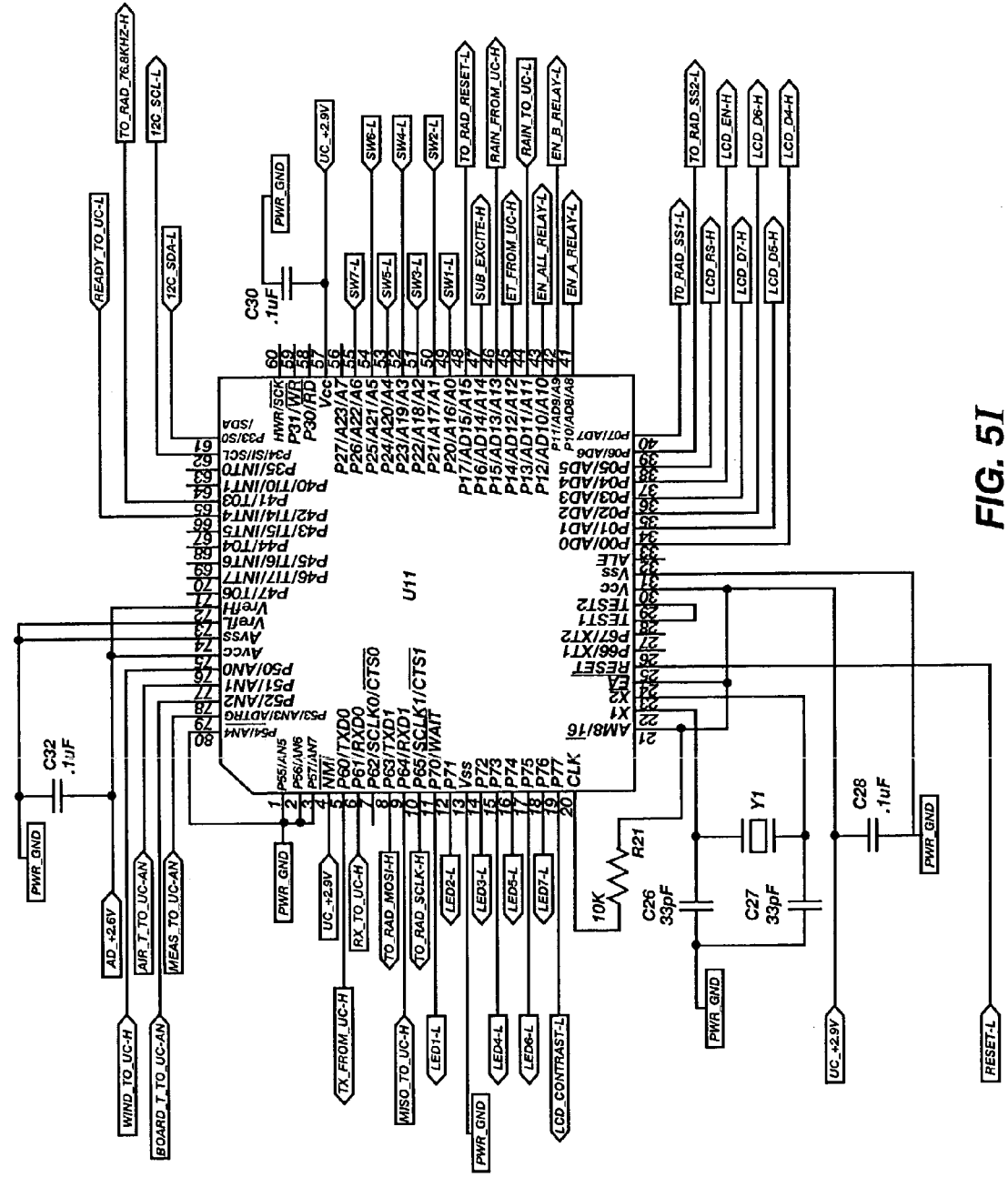
Figure 5J:
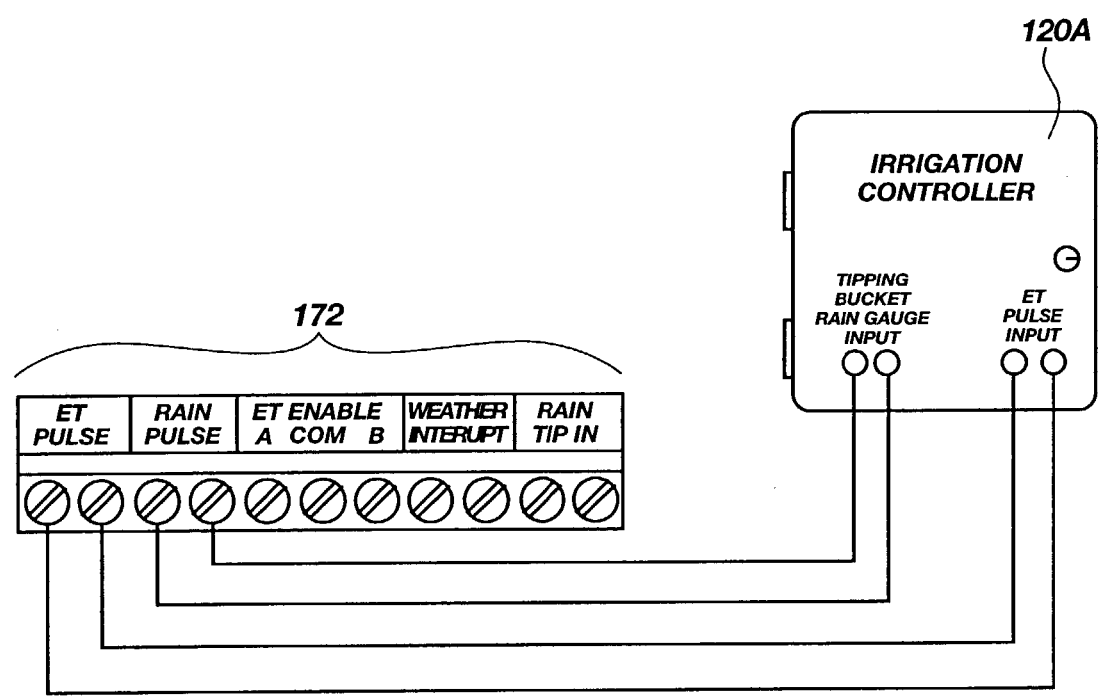
FIGS. 5J-N are diagrammatic representations of exemplary field wiring connections provided in accordance with the present invention to interface with a number of different irrigation controllers available in the industry.

ET pulsed output—There are several brands of irrigation controllers 120 that recognize one momentary switch closure as equal to 0.01-inch of evapotranspiration. Once the irrigation controller 120 receives this value, irrigation schedules may be automatically adjusted. The controller interface 114 may desirably produce a momentary switch closure for each 0.01-inch of evapotranspiration. FIG. 5J illustrates one example of how the ET pulse is connected to a controller interface 120A with an optional rain pulse connection, described further below.

Figure 5L:
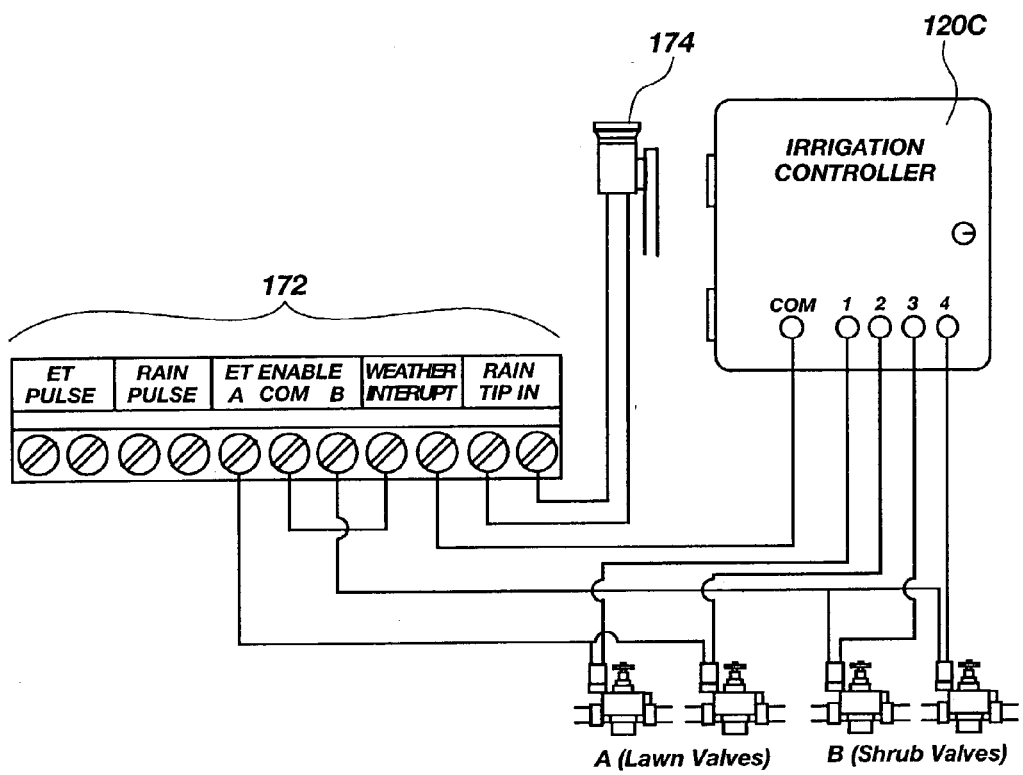
Figure 5K:
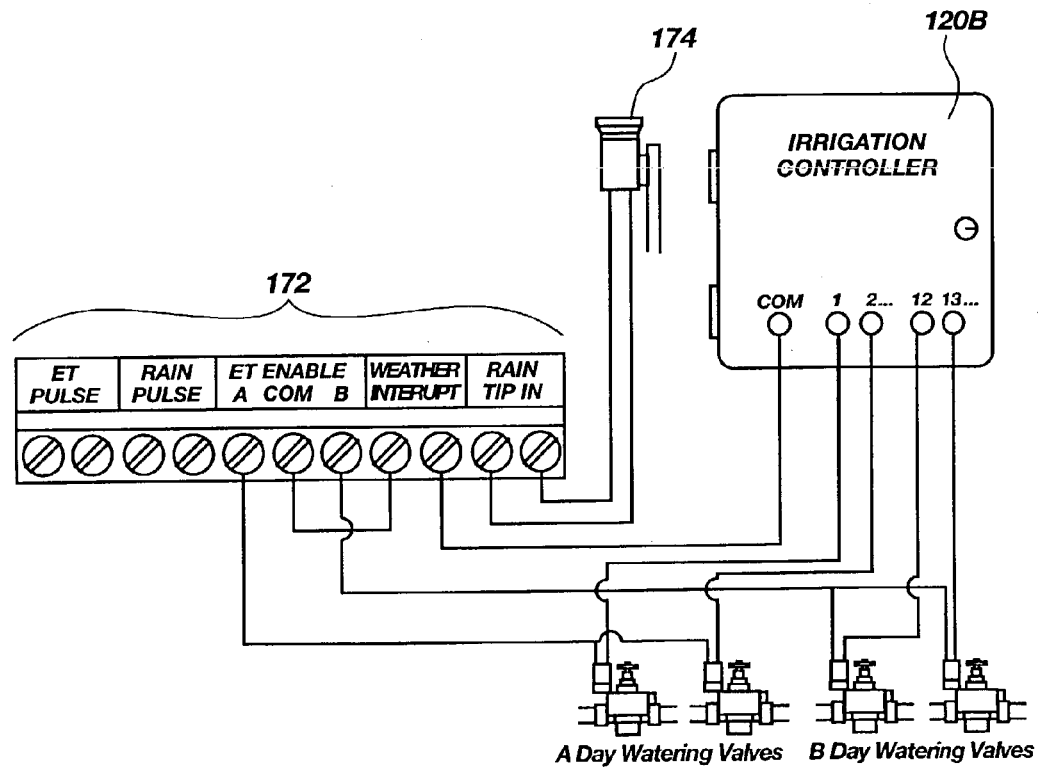

ET Enable—The controller interface 114 may be programmed to enable irrigation once an accumulated evapotranspiration value is reached. This is normally done by interrupting the "common" output of the irrigation controller 120 to the valves 122 until a programmed evapotranspiration threshold is reached. Where an irrigation controller 120 is set to water every day, for example, the controller interface 114 prevents irrigation until enough water is lost from the landscape to require irrigation. The controller interface 114 is capable of interrupting two different circuits, whether present in a single irrigation controller or a plurality discrete irrigation controllers. Each circuit can be programmed with a different evapotranspiration threshold. FIG. 5K illustrates the field wiring connectors 172 configured for ET enable with an irrigation controller 120B where watering is spread over two days. In addition, FIG. 5K shows an optional weather interrupt connection and an optional onsite tipping bucket rain gauge 174. FIG. 5L illustrates a typical wiring from the field wiring connectors 172 to an irrigation controller 120C for ET enable with two separate circuits using an optional weather interrupt connection and an optional onsite tipping bucket rain gauge 174.

ET Trigger—The controller interface 114 will actually trigger an irrigation cycle once a certain evapotranspiration threshold is met. The controller interface 114 sends a start signal to a sensor in the irrigation controller 120. Again, the controller interface 114 may have more than one trigger circuit, thereby allowing different evapotranspiration thresholds.

Rain pulse output—The controller interface 114 may produce a momentary switch closure for each 0.01-inch of rain, for example. There are several irrigation controllers available in the industry that recognize one momentary switch closure as equal to 0.01-inch of rain. Once the irrigation controller 120 recognizes the value, irrigation schedules may be automatically adjusted. FIG. 5J illustrates a connection from the field wiring connectors 172 to an irrigation controller 120A for rain pulse. The ET pulse shown in FIG. 5I is optional in this case. In this sense the controller interface 114 emulates a tipping rain bucket. The controller interface 114 can use rainfall data broadcast by the server 106 or can use input from an optional onsite tipping bucket rain gauge 174 as shown in FIGS. 5K and 5L.

Figure 5N:
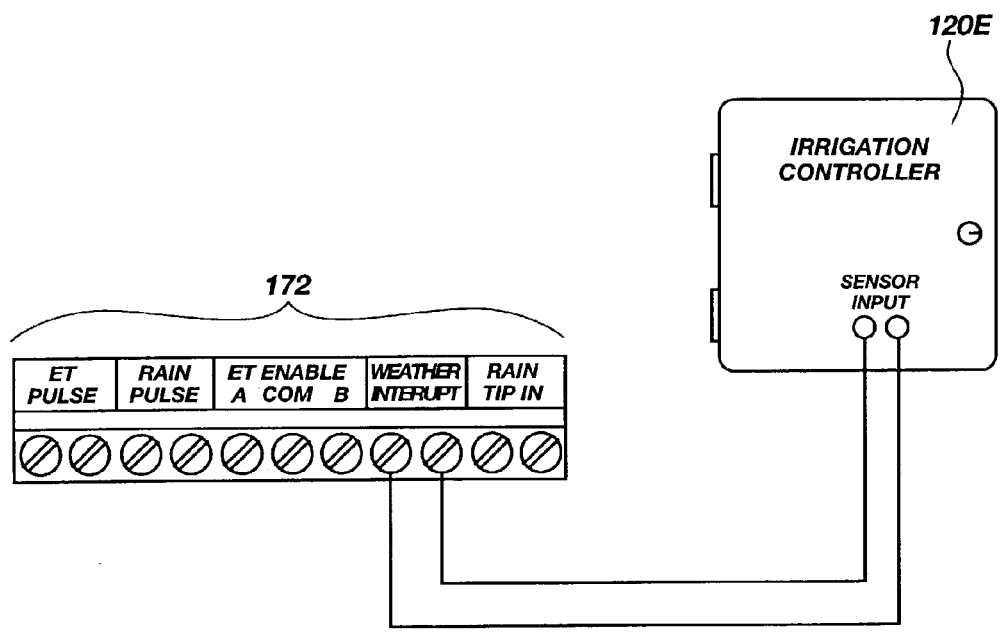
Figure 5M:
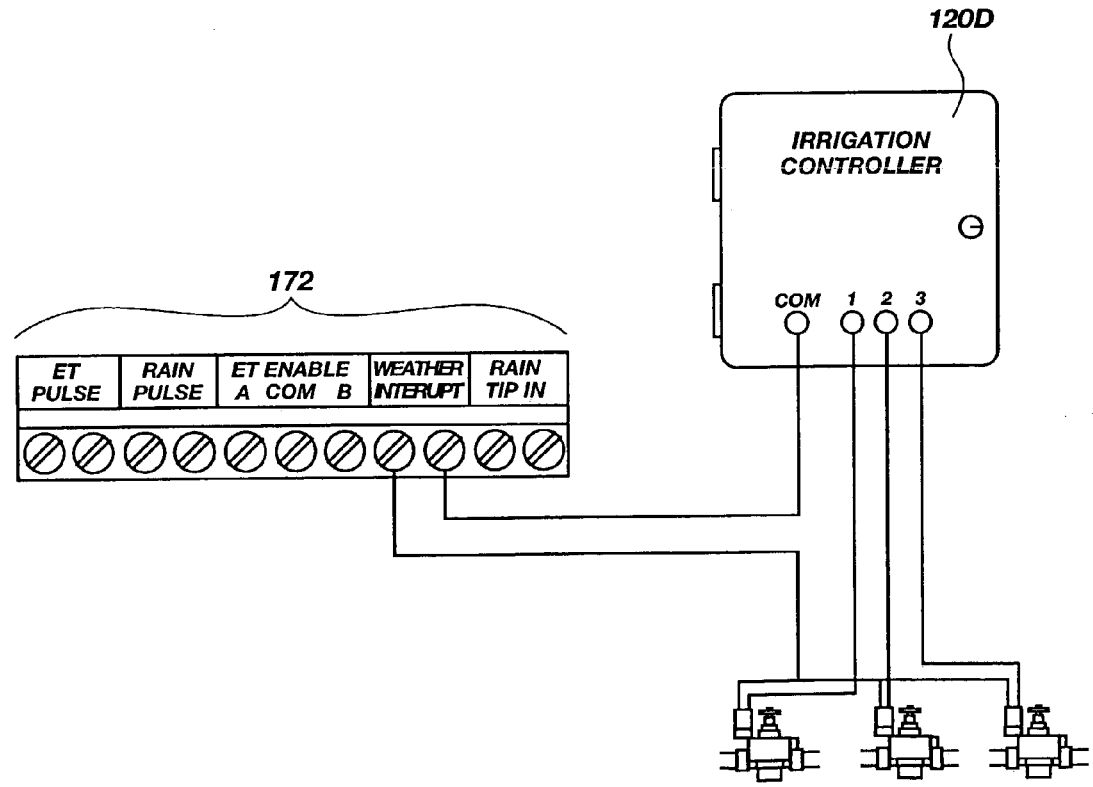

Weather interrupts—Wind, temperature and rainfall values are used in the evapotranspiration formula but can also signal an irrigation interrupt. For example, if the wind is blowing too hard or the temperature drops too low an irrigation cycle can be interrupted. Rainfall can also be programmed to interrupt a watering cycle. FIGS. 5M and 5N illustratively show two additional methods of connecting the from the field wiring connectors 172 to the irrigation controller, 120D and 120E respectively.

Direct data transfer—Irrigation controller manufacturers can design an irrigation controller to directly access the data in the controller interface 114. A controller interface 114 that may be manufactured as part of the original equipment in an irrigation controller may not have a display or keypad and could be installed as part of an irrigation controller as an integral unit within the scope of the present invention. If separate, the controller interface 114 and the irrigation controller may be connected by an RS-232 cable, or can be connected by any of the available communication protocols or standards available in the industry. As shown in FIG. 4, the connector 166 which was described as being used to connect to a computer 168 can also be used to connect to an irrigation controller (not shown in FIG. 4) having a similar connection configuration (also not shown in FIG. 4).

TTL—The controller interface 114 can also be configured as an OEM product integrated into an irrigation controller 120. The received weather data and evapotranspiration is also accessed via Transistor-Transistor Logic (TTL), a common semiconductor technology for building discrete digital logic integrated circuits.

It will be appreciated that the structures and apparatus disclosed herein are merely one example of an interface means in accordance with the present invention. It will be understood that any structure, apparatus or system for interfacing a signal with a particular device which performs functions the same as, or equivalent to, those systems and structures disclosed herein are intended to fall within the scope of a means for interfacing, including those structures, apparatus or systems for collecting data which are presently known, or which may become available in the future. Anything which functions the same as, or equivalently to, a means for interfacing falls within the scope of the corresponding claim terminology used herein.

Once the controller interface 114 receives the weather data from the weather station 102, it will calculate the amount of water required to sustain the landscape. As previously explained, this value is known as evapotranspiration. The evapotranspiration can be further adjusted by a crop coefficient either transmitted with the weather data or preprogrammed into the controller interface 114. It should be noted that evapotranspiration is one type of watering indicator, and that any other type of watering indicator calculated from values obtained at least partially from weather data, is within the scope of the present invention. As used herein, the term water indicator is defined as a value derived from a one or more mathematical operations to ascertain the watering needs of some portion of landscape, whether that value represent evapotranspiration or some other indicator.

Those skilled in the art will appreciate that evapotranspiration may be calculated using various different equations, such as the Standardized Reference Evapotranspiration Equation or the FAO Penman-Monteith equation, the use of any of which are equivalent and within the scope of the present invention. It should also be noted that the various methodologies and procedures are known by those skilled in the art and those skilled in the art can modify the above named equations for varying circumstances and all modifications are considered to be within the scope of the present invention. In addition, the term evapotranspiration as used herein means both the actual evapotranspiration or the potential evapotranspiration, as the context requires.

Further, in the event that the controller interface 114 fails to receive real-time weather data for any reason, the controller interface 114 can be configured to use historical data. Thus, given a lack of available real-time data, a value based on historical data, derived over a period of time which can vary from hours to years, can be usefully implemented in accordance with the present invention. The historical data can be stored in the controller interface 114 and used as a back-up value in the event real-time data was not available. During the activation process local historical data could be entered, the activation process being mentioned in connection with FIGS. 5A-5H, but the values could also be modified in the controller interface 114 in accordance with weather data obtained after activation. For example, in the event real-time data broadcast was suspended or interrupted for several days the controller interface 114 could average the evapotranspiration over a period of time, such as the last seven days. The controller interface 114 could use the averaged values until communication is restored.

Watering frequency and irrigation valve run times can be automatically adjusted based on evapotranspiration using one of the outputs described above. As the weather changes, the amount of water required to sustain the landscape also changes.

In a separate embodiment of the present invention, the receiver 116 is coupled to a display which displays the weather data to a person. For example, the display could sit on a person's desk to keep the person constantly advised of the weather. In another embodiment, the display could be portable.

Figure 6:
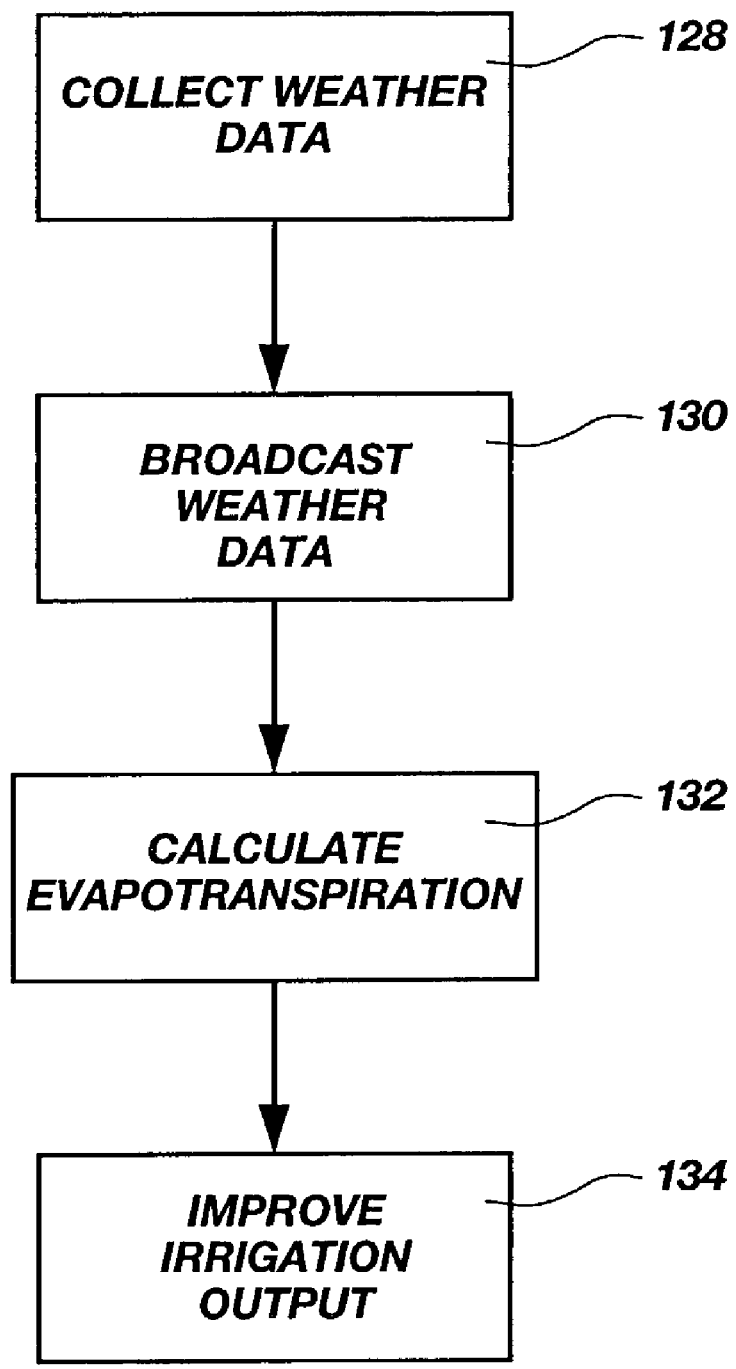
FIG. 6 is a flow diagram showing illustrative steps utilized in the illustrative embodiments of the present invention.

Reference will now be made to the exemplary flow diagram of FIG. 6. According to FIG. 6, in one illustrative embodiment of the present invention the weather data is collected (step 128) which is then broadcasted (step 130). From the weather data, the evapotranspiration is calculated (step 132). The evapotranspiration is then used to improve the irrigation output (step 134).

Figure 7:
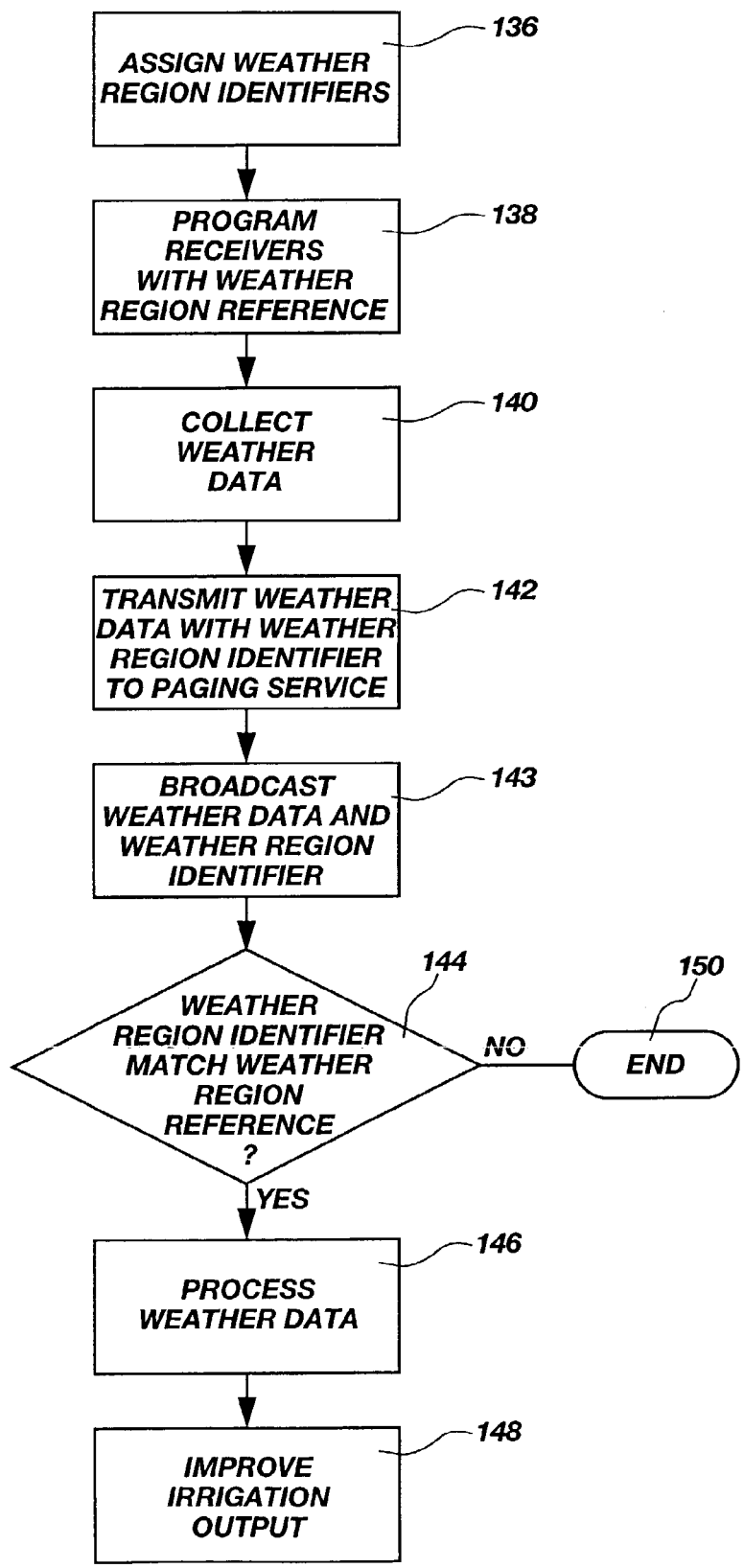
FIG. 7 is a flow diagram showing illustrative steps utilized in the illustrative embodiments of the present invention.

Reference will now be made to the exemplary flow diagram of FIG. 7. According to FIG. 7, in one illustrative embodiment of the present invention each weather region is assigned a weather region identifier (step 136). The receivers are programmed with a corresponding weather region reference (step 138). Once this has been completed, the weather data is collected (step 140) and transmitted to a commercial paging service (step 142) along with the weather region identifier. The commercial paging service broadcasts the weather data and the weather region identifier (step 143). The receiver then accepts the weather data if the weather region identifier matches the preprogrammed weather region reference (step 144) and processes the weather data (step 146) to improve the irrigation output (step 148). Otherwise the receiver does not process the weather data (step 150).

Figure 8:
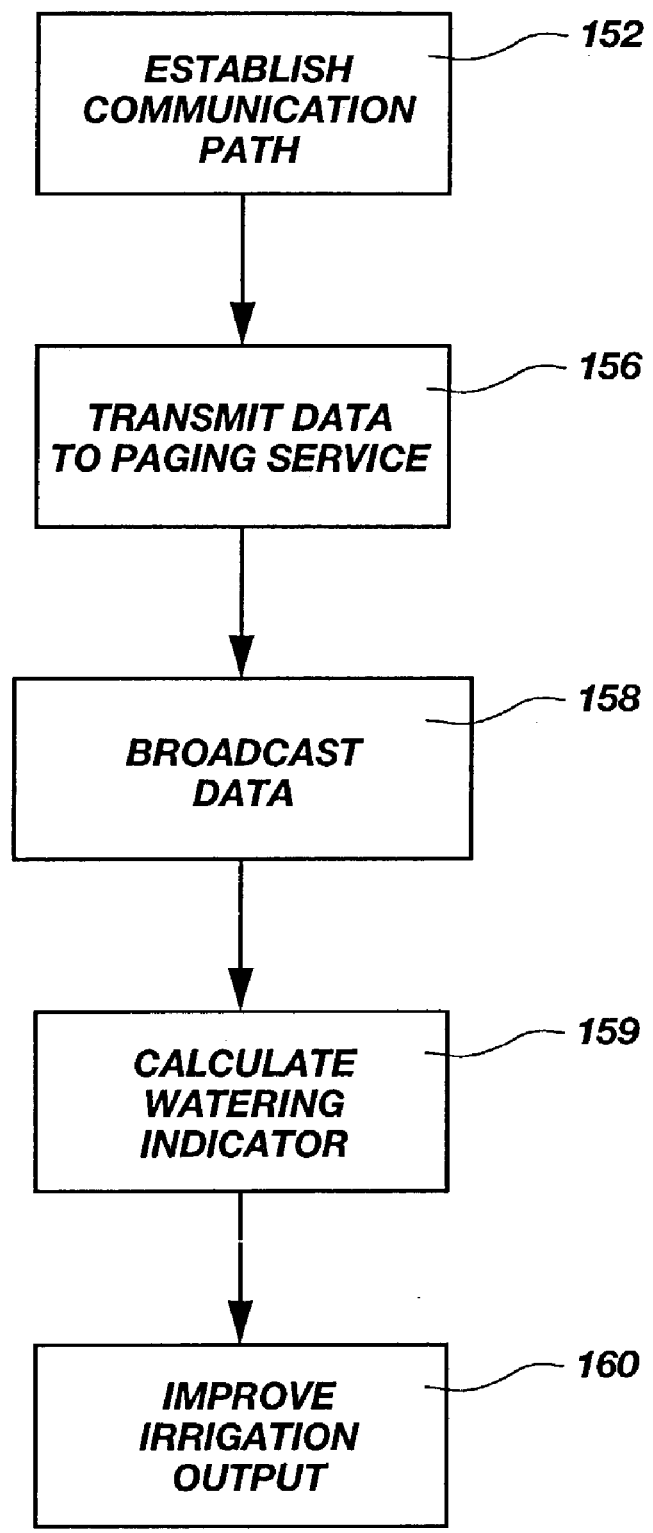
FIG. 8 is a flow diagram showing illustrative steps utilized in the illustrative embodiments of the present invention.

Reference will now be made to the exemplary flow diagram of FIG. 8. In accordance with FIG. 8, in one illustrative embodiment of the present invention a communication path is established (step 152) to a commercial paging service. The data to be broadcasted is then transmitted to the commercial paging service (step 156). The data is then broadcasted (step 158). The data is then used to calculate a watering indicator (step 159). The watering indicator then is utilized to improve the irrigation output (step 160).

Table 2, below, illustrates test results from the use of one illustrative embodiment of the present invention. A receiver and controller interface within the scope of the present invention were connected to a Rain Bird® ESP-8 controller located in a municipal park in North Salt Lake City, Utah. As can be seen, there was a dramatic decrease in the amount of water used in the year 2002, the year the invention was put in use, compared to the previous years, 2000 and 2001.

TABLE 2

| Year | 2000 | 2001 | 2002 |
| --- | --- | --- | --- |
| Target Gallons | 494,534 | 535,470 | 467,206 |
| Actual Use | 1,354,000 | 1,183,000 | 645,000 |
| Actual Use vs. Need | 274% | 221% | 138% |
| | | Average Savings | 44% |

Those having ordinary skill in the relevant art will appreciate the advantages provided by the features of the present invention. For example, the present system provides a simple, low cost means to get weather data to irrigation controllers to improve irrigation. Weather data can be used to calculate evapotranspiration, prevent watering when it is raining, cancel watering in freezing conditions and interrupt irrigation in high wind conditions. This will save water and improve the health of the landscape. Moreover, many water districts have implemented water conservation programs. Available water resources are being stretched, as is the delivery infrastructure. Landscape water use consumes over half the culinary supplies in some areas of the world. Some water districts have billing structures that create a monthly water allowance based on evapotranspiration. Embodiments of the present invention can improve the service level a water district provides. The embodiments of the present invention can be implemented on a local, regional or state level. The signal providing weather data may be broadcasted with the same codes to all controller interfaces within a weather region.

It will be appreciated the present invention provides advantages not previously available in the industry. For example, one aspect of the present invention provides great advantages over the available art since it broadcasts the weather data directly to a controller interface coupled to an irrigation controller. In this manner, the evapotranspiration is calculated on-site. Even further, the embodiments of the present invention advantageously allow for inclusion of on-site sensors to provide additional or supplemental weather data.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of broadcasting region specific weather data to two or more controller interfaces residing in distinct weather regions, each controller interface in communication with a radio-frequency receiver, said method comprising the steps of:
   assigning a weather region identifier for each distinct weather region;
   configuring each controller interface to only process broadcasts for the weather region in which it resides;
   collecting weather data for one of the distinct weather regions, said weather data selected from the group consisting essentially of wind speed data, temperature data, solar radiation data, humidity data, and rainfall data;
   transmitting to a commercial paging service the weather data and the weather region identifier for the weather region for which the weather data pertains;
   receiving the weather data and weather region identifier at at least one of the two or more controller interfaces via their respective radio-frequency receivers;
   processing the weather data if the controller interface resides in the weather region to which the weather data pertains, said processing including calculating evapotranspiration, wherein said calculated evapotranspiration is based solely upon up-to-date weather data; and
   outputting a control signal from the controller interface residing in the weather region to which the weather data pertains to an irrigation controller to improve irrigation.

2. The method of claim 1 wherein the step of configuring each of the controller interfaces comprises the step of connecting each of the controller interfaces to a computer, said computer running software operative to assist in the configuring of the controller interface.

3. The method of claim 1 wherein the step of collecting the weather data comprises the step of downloading the weather data from a weather station to a computer.

4. The method of claim 1 further comprising the step of encoding the weather data and weather region identifier prior to transmitting to the commercial paging service.

5. The method of claim 1 wherein the step of processing the weather data comprises the step of calculating the evapotranspiration from the weather data.

6. The method of claim 5 further comprising the step of adjusting the evapotranspiration based upon a crop coefficient.

7. The method of claim 1 wherein the controller interface also receives one or more weather measurements gathered from one or more local weather sensors directly connected to said controller interface, said one or more weather measurements used in conjunction with the weather data to calculate the evapotranspiration.

8. The method of claim 1, wherein the step of receiving the weather data comprises receiving the weather data from a satellite.

9. The method of claim 1, wherein the step of receiving the weather data comprises receiving the weather data via approximately the 900 MHz paging band.

10. The method of claim 1, wherein the step of receiving the weather data comprises receiving the weather data via a radio network.

11. The method of claim 1, wherein the step of receiving the weather data comprises receiving the weather data via a cellular phone network.

* * * * *